United States Patent
Numao et al.

(10) Patent No.: US 8,117,456 B2
(45) Date of Patent: Feb. 14, 2012

(54) NETWORK SYSTEM, SERVER AND INFORMATION TERMINAL FOR LIST MATCHING

(75) Inventors: Masayuki Numao, Kawasaki (JP); Yuji Watanabe, Tokyo-to (JP)

(73) Assignee: International Business Machines Corporation, Armonk, NY (US)

(*) Notice: Subject to any disclaimer, the term of this patent is extended or adjusted under 35 U.S.C. 154(b) by 144 days.

(21) Appl. No.: 12/535,777

(22) Filed: Aug. 5, 2009

(65) Prior Publication Data
US 2009/0327413 A1 Dec. 31, 2009

Related U.S. Application Data

(62) Division of application No. 10/264,823, filed on Oct. 3, 2002, now Pat. No. 7,979,712.

(30) Foreign Application Priority Data

Jul. 1, 2002 (JP) .................................. 2002-191591

(51) Int. Cl.
G06F 17/00 (2006.01)
G06F 7/00 (2006.01)
G06F 17/30 (2006.01)

(52) U.S. Cl. ........ 713/177; 707/698; 707/747; 708/603; 708/605

(58) Field of Classification Search .................. None
See application file for complete search history.

(56) References Cited

U.S. PATENT DOCUMENTS

| | | | | |
|---|---|---|---|---|
| 5,202,921 A | * | 4/1993 | Herzberg et al. | 713/162 |
| 5,708,714 A | * | 1/1998 | Lopez et al. | 713/180 |
| 6,076,163 A | * | 6/2000 | Hoffstein et al. | 713/168 |
| 6,092,233 A | * | 7/2000 | Yang | 714/784 |
| 6,157,955 A | * | 12/2000 | Narad et al. | 709/228 |
| 6,381,601 B1 | * | 4/2002 | Fujiwara et al. | 707/692 |
| 6,442,553 B1 | * | 8/2002 | Take | 707/747 |
| 6,654,701 B2 | * | 11/2003 | Hatley | 702/122 |
| 6,738,779 B1 | * | 5/2004 | Shapira | 707/747 |
| 6,904,558 B2 | * | 6/2005 | Cavanna et al. | 714/781 |
| 6,981,151 B1 | * | 12/2005 | Groeneveld et al. | 713/193 |
| 7,168,025 B1 | * | 1/2007 | Berkovich | 714/759 |

OTHER PUBLICATIONS

Lewis, Ted G.; Cook, Curtis R. "Hashing for Dynamic and Static Internal Tables". IEEE Computer Society. vol. 21, Issue 10. Pub. Date: Oct. 1988. Relevant pp. 45-56. Found on the World Wide Web at: http://ieeexplore.ieee.org/stamp/stamp.jsp?tp=&arnumber=7056.*

(Continued)

*Primary Examiner* — Nathan Flynn
*Assistant Examiner* — Jeremiah Avery
(74) *Attorney, Agent, or Firm* — Ido Tuchman; William J. Stock

(57) ABSTRACT

A method, apparatus and system to ensure the security in the information exchange and to provide list matching with higher efficiency and practicality. In a particular embodiment, each of lists to be subject to list matching is represented as a polynomial having roots equivalent to the items of the list. Then, polynomials generated for the lists to be subject to list matching are added according to a distributed secret computation. A list containing an item equivalent to a root of a polynomial resulting from the addition is created and output as the list of a common item.

3 Claims, 18 Drawing Sheets

OTHER PUBLICATIONS

Smith, James. De Micheli, Giovanni. "Polynomial Methods for Component Matching and Verification". 1998 IEEE/ACM International Conference on Computer-Aided Design. Pub. Date: Nov. 1998. Relevant pp. 678-685. Found on the World Wide Web at: http://ieeexplore.ieee.org/stamp/stamp.jsp?tp=&arnumber=743096.*

Naor, Moni et al., "Oblivious Transfer and Polynomial Evaluation," STOC'99 Atlanta GA, pp. 245-254 (1999).

Ben-Or, Goldwasser et al., "Completeness theorems for non-cryptographic fault-tolerant distributed computation," ACM-0-89791-264-0/88/0005/001, pp. 1-10 (1988).

* cited by examiner

NETWORK SYSTEM, SERVER AND INFORMATION TERMINAL FOR LIST MATCHING

RELATED APPLICATIONS

This application is a divisional application filed under 35 U.S.C. 120 and claims priority to U.S. patent application Ser. No. 10/264,823 filed Oct. 3, 2002, which claims a right of priority under 35 U.S.C §119 from Japanese Patent Application No. 2002-191591 filed Jul. 1, 2002.

FIELD OF THE INVENTION

The present invention relates to a method for list matching on a network, in which a common part among lists held by two or more participants is extracted.

BACKGROUND

Information exchanges via a network include list matching, in which only a common part among lists held by two or more participants is computed and extracted. A specific application of the list matching is a match making service, in which the list matching is performed on a database (list) describing a profile of a member including an interest, and members having common interests are introduced to each other. Besides, the list matching may be utilized by a plurality of financial institutes to query a list of specific users (black list, for example) to find users listed by the plurality of financial institutes.

Recently, as the network environment, such as Internet, has become widespread, privacy protection on the network has become more important, and thus, the list matching has become required to extract the common part without disclosing the contents of the list held by each participant.

In the past, to implement the list matching on the network, there has been a method of providing a TTP (Trusted Third Party) server to manage the lists to be subject to the list matching and compute the common part on the TTP server. In this case, the list information confidentiality depends on the security of the TTP server.

In addition, a peer-to-peer service not requiring a specific server has become widespread recently, and thus, the list matching may be performed without the TTP server. In order to ensure the security in such a case, there is disclosed a protocol involving a cryptography referred to as an oblivious polynomial evaluation (OPE) in the following Literature 1.

Literature 1: Naor, M. and Pinkas, B, "Oblivious Transfer and Polynomial Evaluation," in proc. of STOC, 1999.

In Literature 1, there is described the following protocol:

It is assumed that Alice and Bob, the list holders, have list $AL=\{a_1, \ldots, a_n\}$ and $BL=\{b_1, \ldots, b_n\}$, respectively;

1. Alice and Bob prepare nth order polynomials $P_A(x)$ and $P_B(x)$, respectively, in secret;

2. Alice uses the OPE to compute $[P_B(a_i)]_{i=1}^n$, and Bob also uses the OPE to compute $[P_A(b_i)]_{i=1}^n$; and 3. Alice opens $[P_A(a_i)+P_B(a_i)]_{i=1}^n$, and Bob opens $[P_A(b_i)+P_B(b_i)]_{i=1}^n$.

According to this method, with respect to a known item in a list, a third party cannot estimate the presence or absence of the common item in another list.

As described above, in the case of the information exchange through the list matching, if the system includes the TTP server to manage the list to be subject to the list matching, the list information confidentiality depends on the security of the TTP server. Therefore, if the security of the TTP server is broken, confidential information in the list will be leaked.

Besides, according to the protocol involving the OPE used for the peer-to-peer list matching disclosed in Literature 1, it is possible to prevent a third party from, with respect to a known item in a list, estimating the presence or absence of the common item in another list. However, one list holder can falsify an open value to make the other list holder believe in a mismatch, while he/she exclusively knowing the common part with the other.

Besides, methods for performing computation with an argument kept in secret among a plurality of parties and extracting the computation result for the argument include a method referred to as a distributed secret computation (multiparty protocol). The protocol involving the OPE is also included in the distributed secret computation. The distributed secret computation is described in, for example, the following Literature 2.

Literature 2: Ben-Or, Goldwasser, and Wigderson, "Completeness theorems for non-cryptographic fault-tolerant distributed computation," STOC, ACM, 1988.

To extract a common part from a plurality of lists by means of list matching, a comparison computation for each item is essential. Thus, for two lists each containing n items, $n^2$ comparison computations are needed. Such a comparison computation can be easily programmed.

However, the distributed secret computation essentially involves addition and multiplication of two values, and therefore, it is difficult to include therein a branch instruction or the like required for the comparison computation. Thus, the peer-to-peer list matching using the distributed secret computation has been difficult in terms of efficiency in processing.

SUMMARY OF THE INVENTION

Thus, the present invention provides methods, apparatus and systems to ensure the security in information exchange and to provide list matching with higher efficiency and practicality.

In addition, this invention aims to provide a secure method for peer-to-peer list matching using the distributed secret computation.

This invention, which attains the objects, provides a list matching method of extracting a common item among a plurality of lists by using a computer, characterized in that lists to be processed are read out from a memory, a polynomial having roots equivalent to the items of the list is generated for each of the read-out lists, the generated polynomials are added, and a list containing an item constituted by a root of a polynomial resulting from the addition is generated and output.

More specifically, first, for each list, a polynomial having the roots whose value is obtained by adding the value of item in the list to the value of the one-way hash function applied to the value of item, is generated. Then, the result list is generated by adding the said polynomials. Among the roots of the results polynomial, only the roots that consist of the value and its hash function are extracted as the common items of the given lists.

In addition, this invention provides a list matching method of extracting a common item among a plurality of lists held by a plurality of information terminals constituting a network, which satisfies the following requirements. That is, each of the information terminals holding a list generates a polynomial having the roots equivalent to the items of the list. Then, the information terminals adds the respective polynomials to the polynomial received from a preceding information terminal and passes a polynomial resulting from the addition to a subsequent information terminal in a predefined order. In addition, a last information terminal in this order generates a list containing an item equivalent to the roots of the received polynomial.

Here, the last information terminal can inform the other information terminals of the generated list or information on the items of the list.

In addition, this invention provides a list matching method of extracting the common items among a plurality of lists held by a plurality of information terminals constituting a network, which satisfies the following requirements. That is, each of the information terminals holding a list generates a polynomial having roots equivalent to the items of the list. Then, the polynomials generated by the information terminals are added through a distributed secret computation involving a plurality of servers on the network arranged to be commonly used by the information terminals. In addition, the information terminal restores a polynomial resulting from the addition of the polynomials generated by the information terminals based on the result of the addition by the servers, and generates a list containing an item equivalent to a root of the reproduced polynomial.

In addition, this invention provides a list matching method of extracting common items among a plurality of lists held by a plurality of information terminals interconnected via a network, which satisfies the following requirements. That is, each of the information terminals holding a list generates a bivariate polynomial based on a first polynomial having roots equivalent to the items of the list and a second polynomial whose order corresponds to the predetermined number of servers on the network and distributes the bivariate polynomial to the servers according to the second polynomial. Then, the servers add the polynomials transmitted from the information terminals, the polynomials being the bivariate polynomial distributed to the information terminals, and send back the addition result to the information terminals. Then, the information terminal restores a polynomial resulting from the addition of the polynomials describing the lists held by the information terminals based on the result of the addition by the servers, and generates a list containing items equivalent to the roots of the restored polynomial.

Furthermore, another list matching method according to this invention is characterized in that a predetermined information terminal obtains open information generated based on a polynomial having the roots equivalent to the items of the list held by another terminal apparatus, verifies the open information obtained from the another information terminal, and, based on the open information of the another information terminal having passed the verification and the polynomial having the roots equivalent to the items of the list held by the terminal itself, determines a common item among the list used to generate the open information and the list held by the terminal itself.

Advantageously, only when the open information obtained from the another information terminal passes the verification, the predetermined information terminal generates predetermined information based on the polynomial generated from the list held by the terminal itself and the open information and exchanges the information with the another information terminal. Then, based on the predetermined information exchanged, the predetermined information terminal determines the common item among the list used to generate the open information and the list held by the terminal itself.

Furthermore, this invention is implemented as a network system configured as follows. That is, the network system comprises a server and a plurality of client terminals interconnected via a network. The client terminal adds a polynomial describing a list to be subject to list matching to a polynomial received from another client terminal via the network and transmits a polynomial resulting from the addition to another client terminal or the server. The server receives a polynomial resulting from the addition of all the polynomials generated by the plurality of client terminals and generates a list containing an item equivalent to a root of the polynomial.

DESCRIPTION OF REFERENCE NUMBERS

101 . . . CPU (Central Processing Unit)
103 . . . Main Memory
105 . . . Hard Disk
106 . . . Network Interface
400 . . . Match Making Server 411, 412-41m . . . . Client Terminal
501, 511 . . . Application Software
502, 512 . . . Network Protocol
503, 513 . . . Network Interface
611-61m . . . . Network Terminal
621-62k . . . . Server
801, 811 . . . Application Software
802, 812 . . . Network Protocol
803, 813 . . . Network Interface
1200 . . . Network Terminal
1201 . . . Commitment Generation Unit
1202 . . . Commitment Verifying Unit
1203 . . . Matching Unit
1204 . . . Matching Result Output Unit
1205 . . . Exception Processing Request Unit
1206 . . . Exception Processing Result Output Unit
1210 . . . TTP Server
1211 . . . Exception Processing Execution Unit

DETAILED DESCRIPTION OF THE INVENTION

Now, the present invention will be described in detail with reference to embodiments shown in the accompanying drawings.

This invention proposes that, for information exchange based on list matching, a list to be subject to the list matching is represented by a multi-dimensional function (referred to as a characteristic function, hereinafter).

A list containing a predetermined item can be represented by a characteristic function by substituting a numerical value for the item and forming the polynomial having the numerical value as a root (hereinafter, "polynomial having a root equivalent to an item" means that the polynomial has, as the root thereof, the numerical value substituting for the item in the list). Thus, to describe n items in a list, it is required to define an nth order polynomial.

Figure 1:
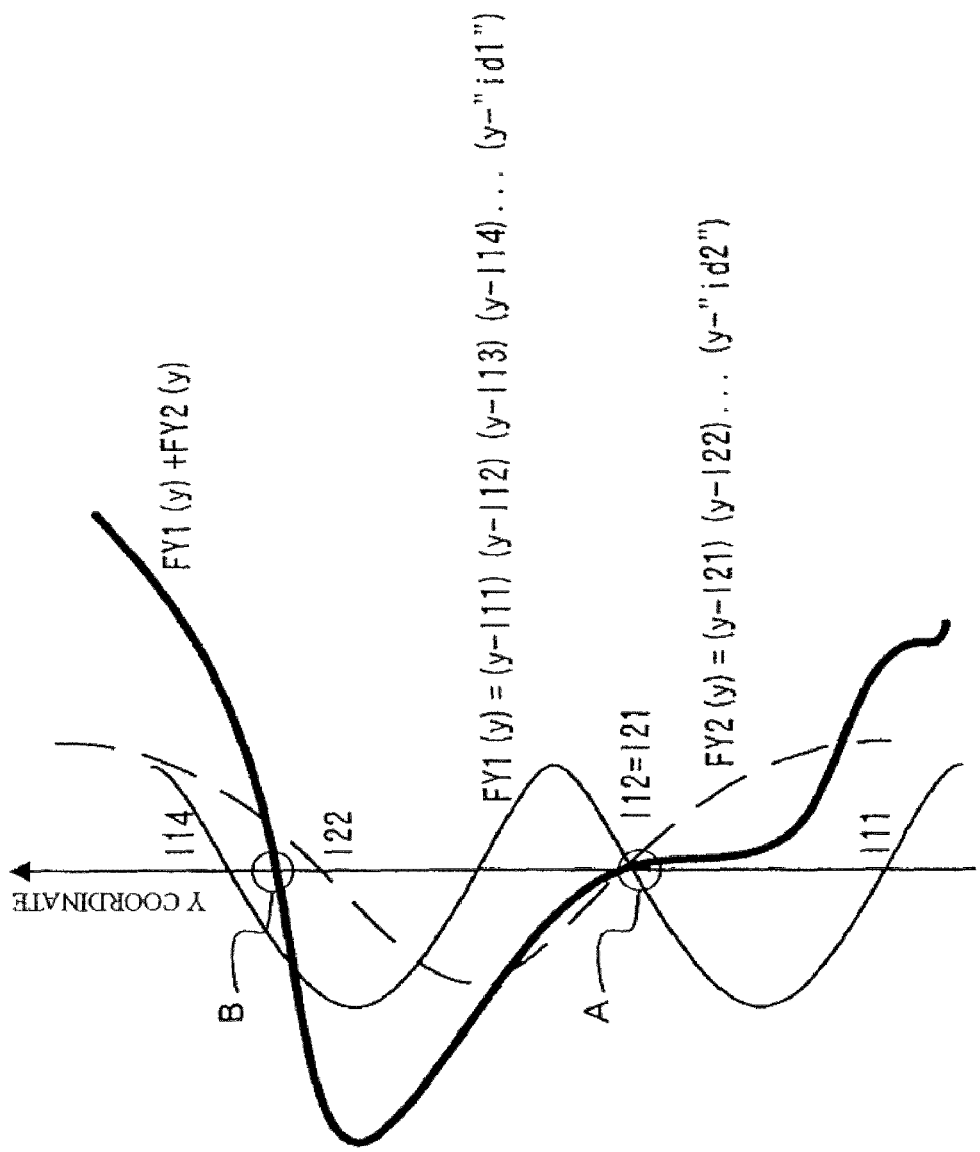
FIG. 1 shows an example of a polynomial having roots equivalent to items in a list, which is a characteristic function used in an embodiment.

FIG. 1 shows an example of a polynomial having roots equivalent to items in a list, which is a characteristic function.

As shown in FIG. 1, representing polynomials describing lists $L_1$ and $L_2$ by $F_{y1}(y)$ (indicated by a solid line in the drawing) and $F_{y2}(y)$ (indicated by a broken line in the drawing), respectively, a polynomial $F_y(y)=F_{y1}(y)+F_{y2}(y)$ (indicated by a thick solid line in the drawing), which is the sum of the two polynomials, also has a root which is a common item to the polynomials, as shown at a coordinate point A. This means that the addition of the polynomials describing the lists $L_1$ and $L_2$ provides the polynomial having the common item as the root. Considering the polynomial in a prime number finite field Z/Zp, the Barlekamp algorithm can be used to factorize a univariate multi-dimensional polynomial to determine the root thereof. Thus, a one-to-one relation can be established in forming the polynomial from the list and in restoring the list from the polynomial. Here, the Barlekamp algorithm is described, for example, in Literature 3.

Literature 3: Donald E. Knuth, Seminumerical Algorithms, the art of computer programming, Addison-Wesley, 1998.

There is a problem in that the sum polynomial may have a root other than the common root as shown at a coordinate point B in FIG. 1. To distinguish the root from the common root, a one-way hash function MD5 is used. That is, a list item 1 is not directly used for the root of the polynomial, but a list item 1||MD5 (1), which additionally includes an operation result of the hash function MD5, is used for the root (the symbol || means a coupling of character strings). Thus, after the addition of the polynomials, the operation result of the hash function MD5 will be held by the root of the sum polynomial. Therefore, when restoring the list, by verifying whether the operation result of the hash function is held by a root or not, it can be distinguished whether the root is produced from a list item or accidentally produced in the course of the addition of the polynomials.

Figure 2:
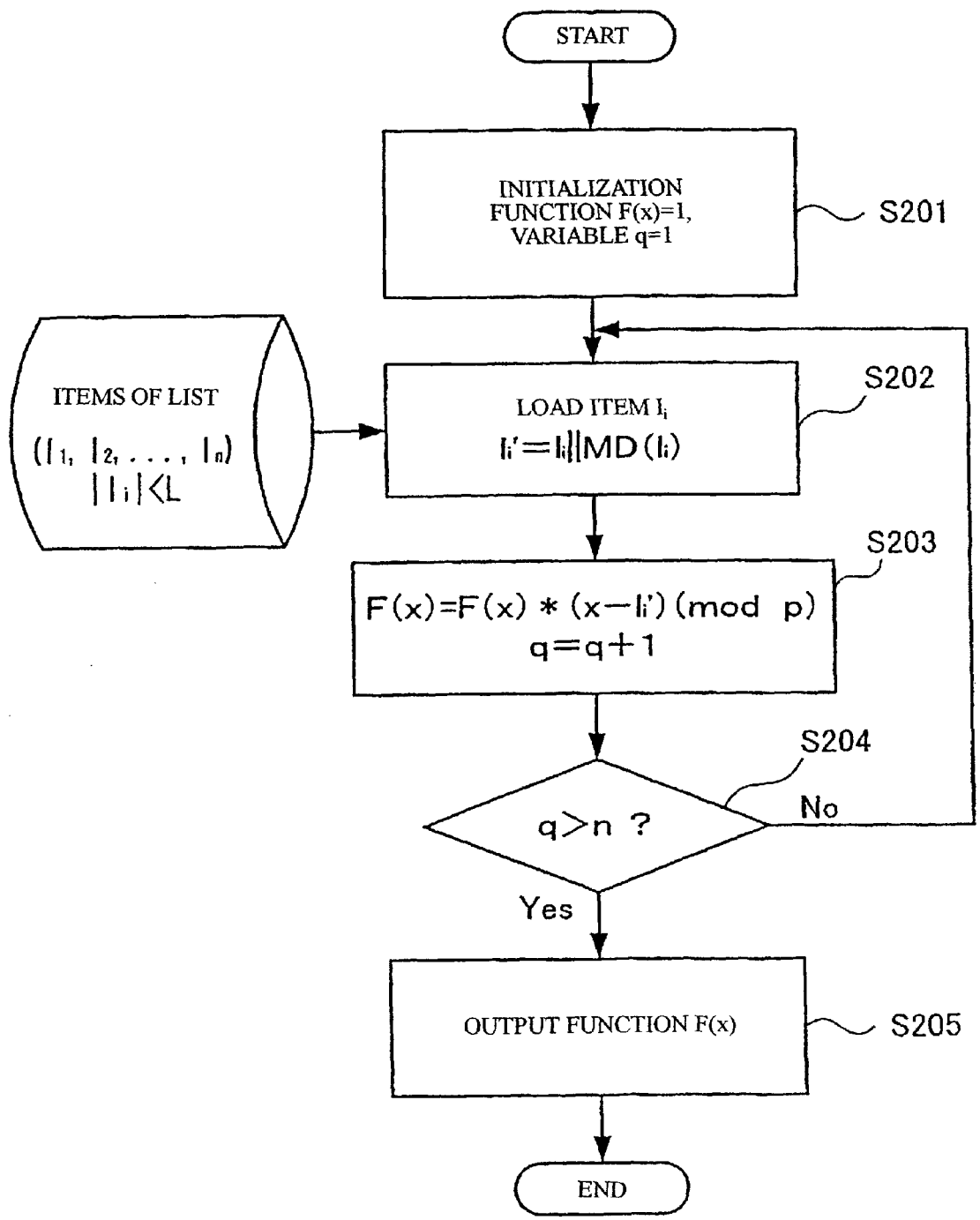
FIG. 2 is a flow chart for illustrating a procedure of configuring the characteristic function polynomial from the list.
Figure 3:
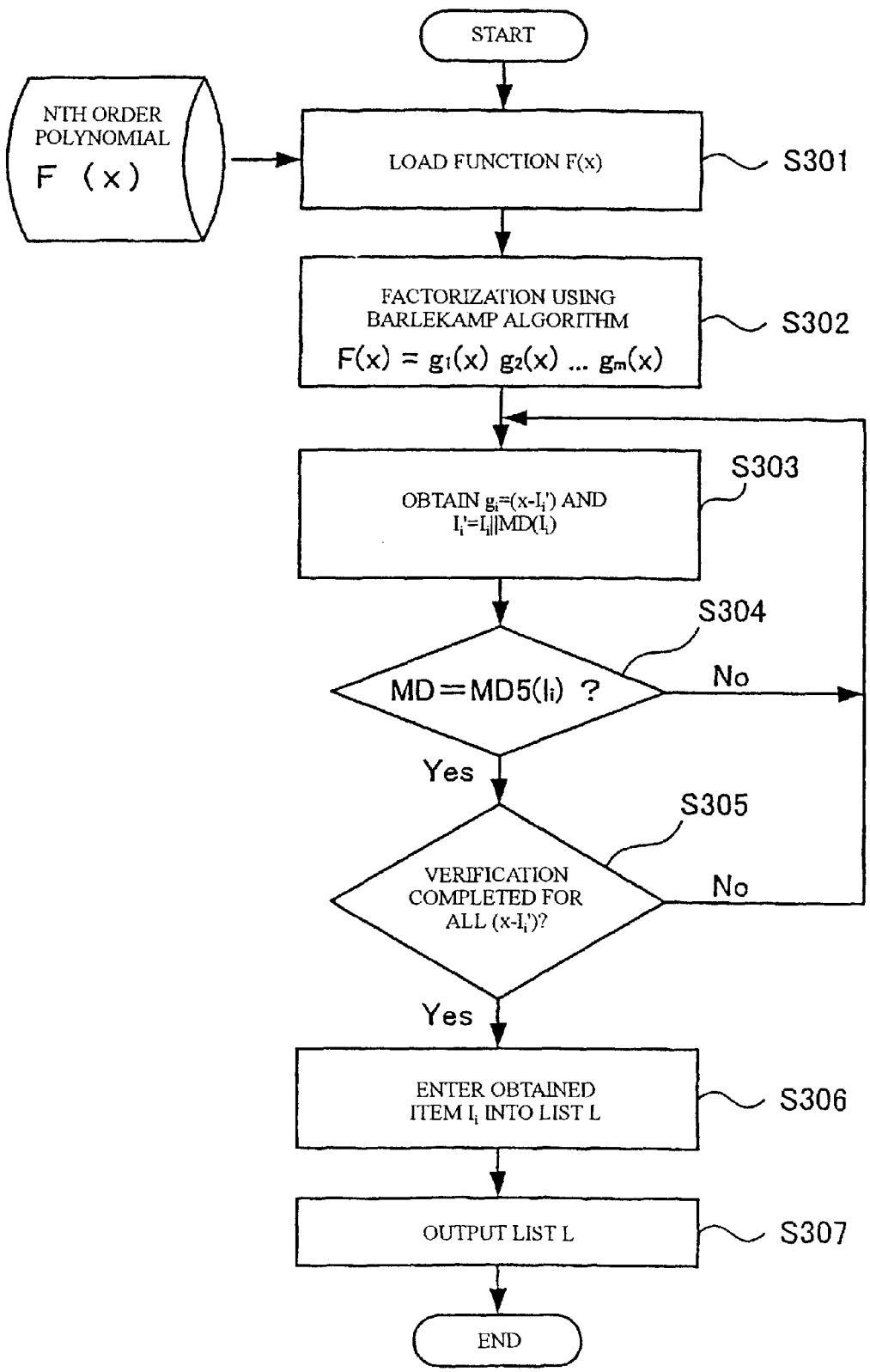
FIG. 3 is a flow chart for illustrating a procedure of reproducing the polynomial to obtain a common item to lists.
Figure 18:
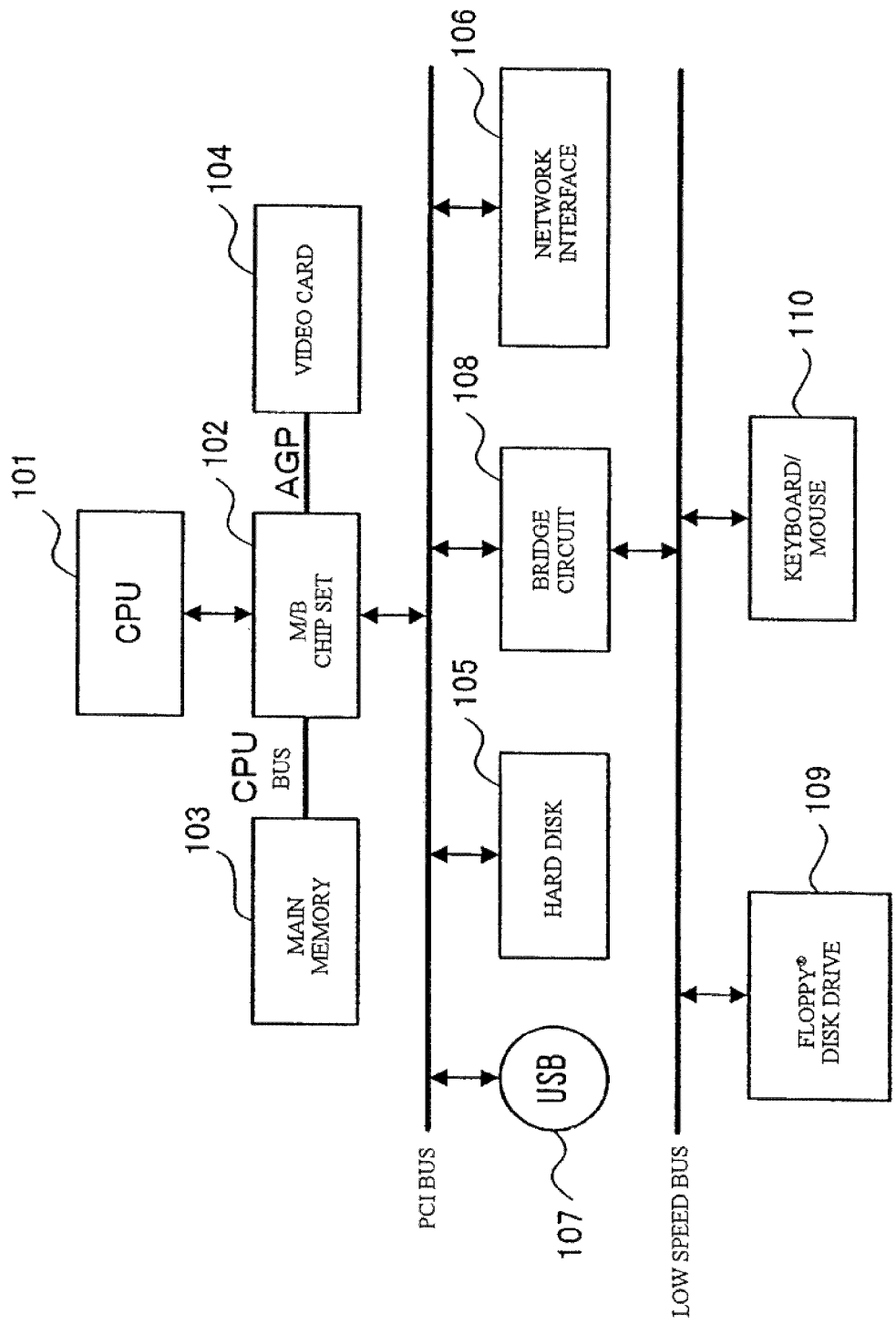
FIG. 18 is a schematic diagram showing an example of a hardware configuration of a computer suitable for implementing the server and the information terminal of the system according to this invention.

FIG. 2 is a flow chart for illustrating a procedure of configuring the characteristic function polynomial from the list, and FIG. 3 is a flow chart for illustrating a procedure of restoring the polynomial to obtain a common item to lists. In this case, for example, processings are performed by a program-controlled CPU in a typical computer apparatus, and the list L and the function F(x), which are to be processed, are stored in a cache memory or main memory in the CPU. FIG. 18 is a schematic diagram showing an example of a hardware configuration of such a computer apparatus.

The computer apparatus shown in FIG. 18 comprises a CPU (Central Processing Unit) 101, which is operation means, a main memory 103 connected to the CPU 101 via an M/B (motherboard) chip set 102 and a CPU bus, a video card 104 connected to the CPU 101 via the M/B chip set 102 and an AGP (Accelerated Graphics Port), a hard disk 105, a network interface 106 and an USB port 107 which are connected to the M/B chip set 102 via a PCI (Peripheral Component Interconnect) bus, and a Floppy® disk drive 109 and a keyboard/mouse 110 which are connected to the M/B chip set 102 via the PCI bus, a bridge circuit 108 and a low-speed bus such as an ISA (Industry Standard Architecture) bus.

Here, FIG. 18 only shows the hardware configuration of the computer apparatus implementing this embodiment as an example, and other various configurations are possible as far as this embodiment can be implemented. For example, instead of providing the video card 104, only a video memory may be provided and image data may be processed in the CPU 101. Alternatively, a drive for a CD-ROM (Compact Disc Read Only Memory) or DVD-ROM (Digital Versatile Disc Read Only Memory) may be connected to the apparatus via an interface such as an ATA (AT Attachment).

Referring to FIG. 2, the CPU 101 first defines a function F(x)=1 and a variable q=1 (step 201), and loads an item $l_i$ in the list L to be processed from the main memory 103. Here, a relation of $l_i'=l_i||MD(l_i)$ is defined (step 202). Then, the CPU 101 redefines a function $F(x)=F(x)*(x-l_i')$ (mod p) and increments the variable q by 1 (step 203). The steps 202 and 203 are repeated until the value q reaches the number n of the items in the list L, and then, the obtained function F(x) is output (steps 204, 205).

In this way, the characteristic function F(x) is formed from the list L.

Referring to FIG. 3, the CPU 101 first loads the nth order function F(x) to be processed from the main memory 103 (step 301), and factorizes the function F(x) using the Barlekamp algorithm (step 302). Then, based on the result of the factorization, the CPU 101 obtains relations of $g_i=(x-l_i')$ and $l_i'=l||MD$ (step 303). For all the factors $(x-l_i')$, an item $l_i'$ which satisfies a relation of $MD=MD5(l_i)$ (that is, an item $l_i'$ which satisfies a relation of $l_i'=l_i||MD5(l_i)$) is extracted (step 304, 305). Then, a list L is generated from the obtained item $l_i'$ (step 306), and the obtained list L is output (step 307).

In this way, the list L is reproduced from the characteristic function F(x).

In terms of security, such a list matching is required to meet the following requirements:

(1) an item commonly appearing in the lists of all the list holders is defined as a common part; and (2) a list holder can only know the common part in contents of a list of another list holder.

According to this definition, the list holders can know whether, only for the items included in their respective lists, each item is common to the other participants or not.

As described above, if a list is represented as a polynomial (characteristic function) having a root equivalent to each item in the list, such polynomials can be summed to provide a polynomial having a root equivalent to a common item to the lists, and thus, the common item to the lists can be obtained from the polynomial resulting from the calculation. That is, the common item to the list can be extracted only through addition without the need for a comparison computation including a branch instruction. Thus, as described later, it is possible to configure a system which computes a common item by the participants sequentially adding polynomials equivalent to their respective lists or a system which computes a common item using the distributed secret computation, and the list matching can be implemented on the network with high security.

Now, an embodiment of the network system that performs the list matching using as the protocol the above-described method of computing the common item by representing the list by the characteristic function will be described.

A system that performs a list matching computation at a TTP server provided on a network and a system that performs the peer-to-peer list matching will be described herein.

Figure 4:
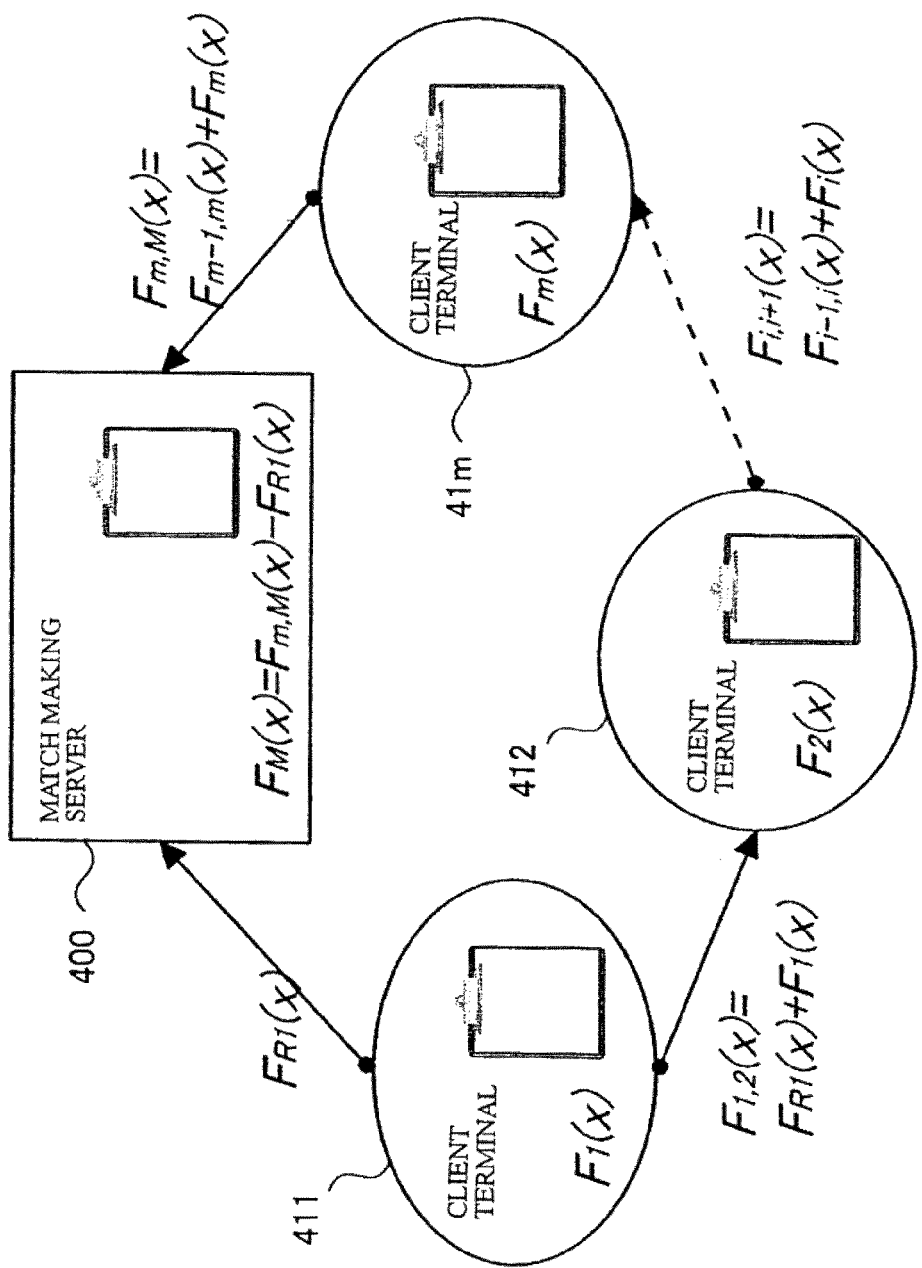
FIG. 4 shows a whole configuration of a system according to a first embodiment, in which list matching is performed at a TTP server on a network.

FIG. 4 shows a whole configuration of the system that performs the list matching at the TTP server on the network.

Referring to FIG. 4, a network system according to this embodiment comprises client terminals of list holders (participants) and a match making server (TTP server) that performs the list matching computation. In the example in FIG. 4, client terminals $411$, $412\text{-}41m$ of m participants and one match making server $400$ are interconnected via the network.

The match making server $400$ according to this embodiment may be a work station, personal computer or other computer apparatus, for example. The client terminals $411$, $412\text{-}41m$ may be a computer apparatus, such as a personal computer, or an information communication terminal, such as a PDA (Personal Digital Assistant) and a cellular phone, for example. The lists to be subject to the list matching are stored in storage means, such as a magnetic disk and semiconductor memory. Typically, the match making server $400$ and the client terminals $411$, $412\text{-}41m$ may be the computer apparatus shown in FIG. 18.

Figure 5:
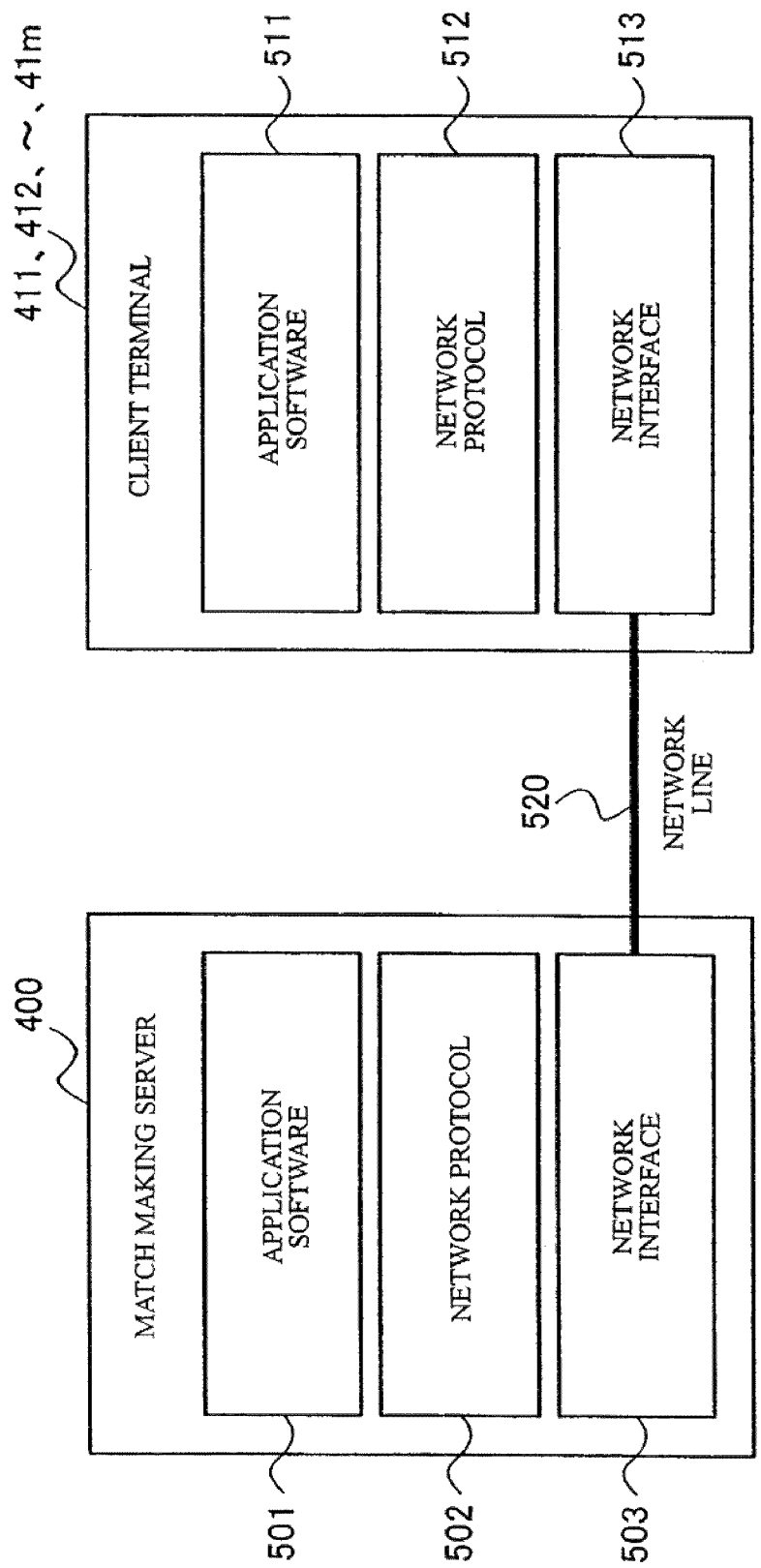
FIG. 5 shows a advantageous system configuration of a match making server and client terminal shown in FIG. 4.

FIG. 5 shows a advantageous system configuration of the match making server $400$ and the client terminal $411$, $412\text{-}41m$ shown in FIG. 4.

As shown in FIG. 5, the match making server $400$ comprises application software $501$, a network protocol $502$ and a network interface $503$, and each of the client terminals $411$, $412\text{-}41m$ comprises application software $511$, a network protocol $512$ and a network interface $513$.

The CPU $101$ controlled by the application software $501$, $511$ performs processings including generation of a list to be processed, formation of a characteristic function polynomial from the list, addition of polynomials and decryption of the list from the polynomial. And, the CPU $101$ controls the network interface $503$, $513$ via the network protocol $502$, $512$. The match making server $400$ and the client terminal $411$, $412\text{-}41m$ communicate with each other by means of the network interface $503$, $513$ through a network line $520$.

The CPU $101$ controlled by the application software $511$ of the client terminal $411$, $412\text{-}41m$ implements a function of outputting a list of common items received from the match making server $400$ according to the protocol described later or information on the list through display means (liquid crystal display, for example) or audio output means provided in the client terminal $411$, $412\text{-}41m$.

The system configuration of the match making server $400$ and the client terminals $411$, $412\text{-}41m$ according to this embodiment is not limited to that shown in FIG. 5. For example, a network OS (operating system) may be provided between the application software $501$, $511$ and the network protocol $502$, $512$.

In the network system configured as described above, the list matching is performed according to the following protocol.

1. The client terminal $411$ composes a polynomial $F_1(x)$ from its list $L_1$. It also generates a list $R_1$ containing random items and composes a polynomial $F_{R1}(x)$ therefrom. Then, it transmits in secret the polynomial $F_{R1}(x)$ to the match making server $400$ and transmits in secret a polynomial $F_{1,2}(x)=F_1(x)+F_{R1}(x)$ to the client terminal $412$.

2. The client terminal $41i$ ($i=2,\ldots,m-1$) transmits in secret to the client terminal $41i+1$ a polynomial $F_{i,i+1}(x)=F_{i-1,i}(x)+F_i(x)$, which is the sum of a polynomial $F_{i-1,i}(x)$ transmitted from the client terminal $41i-1$ and a polynomial $F_i(x)$ describing the list Li of its own.

3. The client terminal $41m$ transmits in secret to the match making server $400$ a polynomial $F_{m,M}(x)=F_{m-1,m}(x)+F_m(x)$, which is the sum of a polynomial $F_{m-1,m}(x)$ transmitted from the client terminal $41m-1$ and a polynomial $F_m(x)$ describing the list $L_m$ of its own.

4. The match making server $400$ decrypts the list of the common items to the clients from a polynomial $F_M(x)=F_{m,M}(x)-F_{R1}(x)$, which is obtained by subtracting the polynomial $F_{R1}(x)$ from the polynomial $F_{m,M}(x)$ transmitted from the client terminal $41m$, and notifies the client terminals $411$, $412\text{-}41m$ of the list.

In this way, the polynomials describing the lists of the participants are added through the client terminals $411$, $412\text{-}41m$ and then, the list of the common parts can be obtained at the match making server $400$. Alternatively, the match making server $400$ may transmit the polynomial $F_M(x)$ equivalent to the list of the common parts to the client terminals $411$, $412\text{-}41m$ as it is, and the list of the common parts may be decrypted at each of the client terminals $411$, $412\text{-}41m$. Besides, such a service may be contemplated that only the number of the common items among the lists is transmitted to the client terminals $411$, $412\text{-}41m$.

The order of the client terminals $411$, $412\text{-}41m$ can be arbitrarily set, and may be changed each time the list matching is performed. However, it is essential that all the client terminals $411$, $412\text{-}41m$ having the list to be processed are involved. Further, the number of the lists to be processed may change each time the list matching is performed. For example, in the case where four client terminals $411$, $412\text{-}41m$ are connected to the match making server $400$, all the four client terminals $411$, $412\text{-}41m$ may be involved in the list matching, or two of the client terminals $411$, $412\text{-}41m$ may be involved in the list matching.

With the network system described above, security is ensured in the following two respects.

First, the match making server $400$ can know only the polynomial resulting from the addition.

Second, the client terminals $411$, $412\text{-}41m$ cannot know the polynomials of the other participants.

The participants will know whether, only for the items included in their respective lists, each item is common to the other participants or not. Therefore, it is possible to prevent a specific list holder from knowing the common with another list holder without disclosing the items of his/her own.

Now, the system that performs the peer-to-peer list matching without the use of the TTP server will be described.

Figure 6:
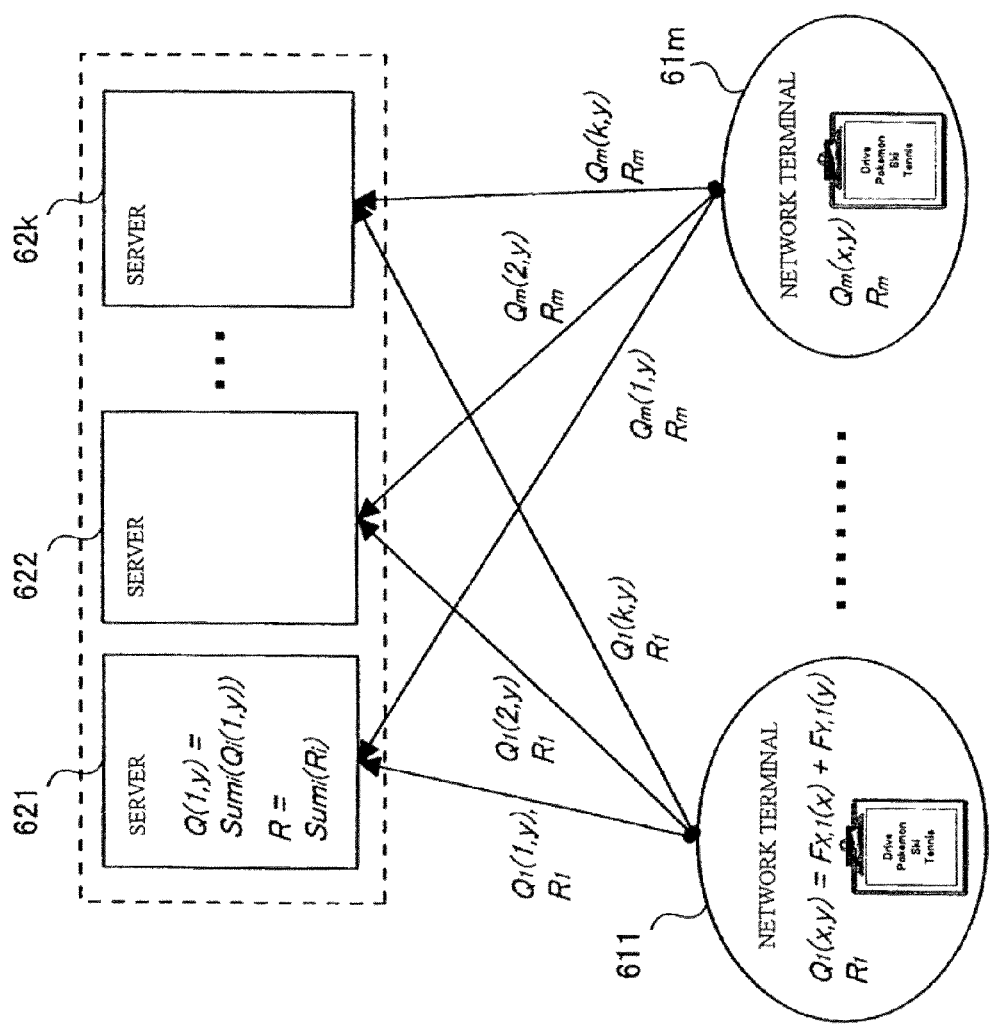
FIG. 6 shows a whole configuration of a system according to a second embodiment, in which list matching is performed based on a peer-to-peer method, illustrating requests for secret distributed computation to servers.
Figure 7:
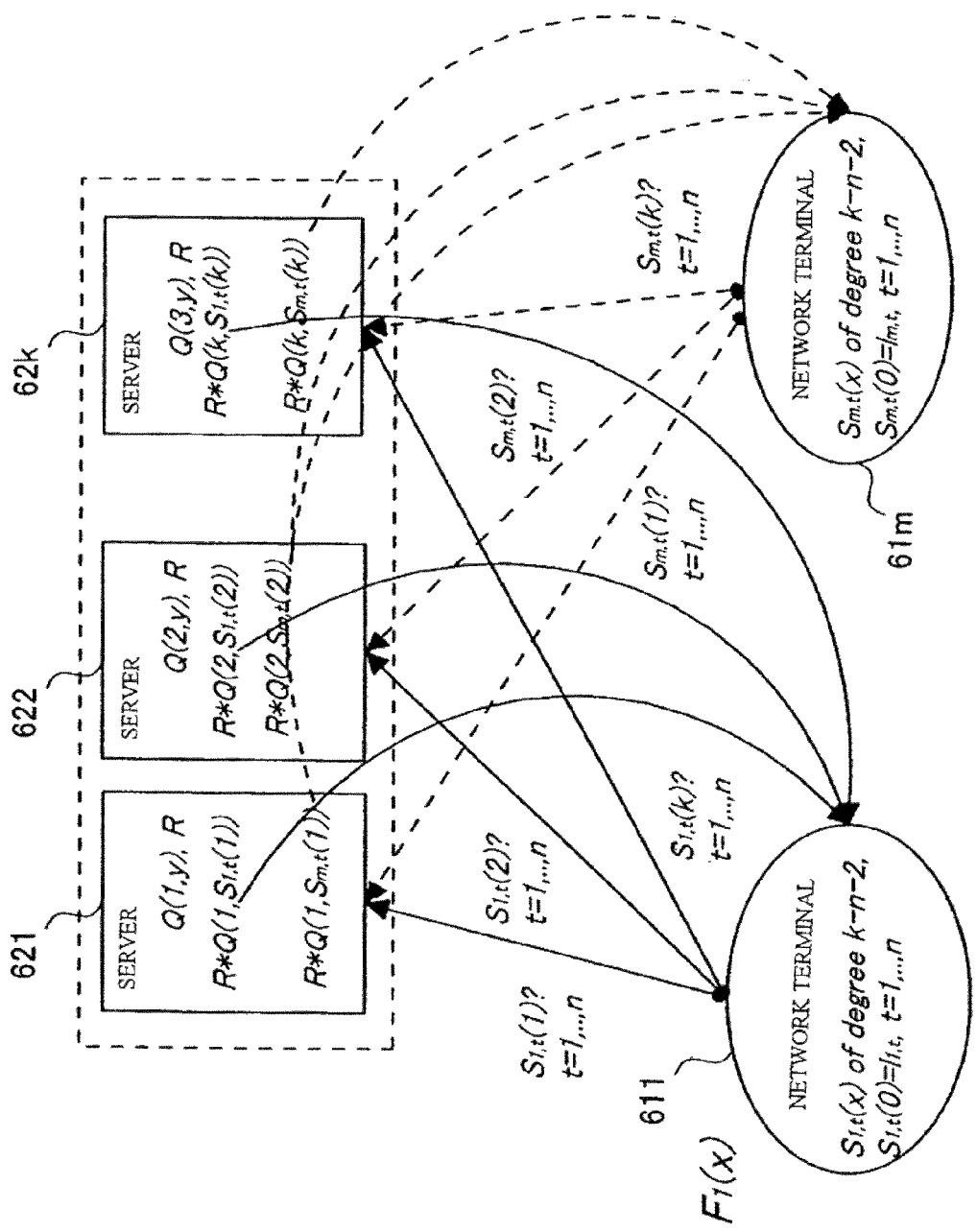
FIG. 7 shows the whole configuration of the system according to the second embodiment, in which list matching is performed based on the peer-to-peer method, illustrating the list matching based on results of the computation by the servers.

FIGS. 6 and 7 show a whole configuration of such a system. In the drawings, operations in the protocol described later are described.

The network system according to this embodiment requires a plurality of servers to be involved in secret distribution. Unlike the match making server 400 described above, the servers are only involved in the computations of the polynomials, and cannot acquire any information about the lists. Referring to FIGS. 6 and 7, in the network system according to this embodiment, network terminals 611-61$m$ of m list holders (participants) and k servers 621-62$k$ involved in the secret distribution are interconnected via the network.

The network terminals 611-61$m$ according to this embodiment may be a computer apparatus, such as a personal computer, or an information communication terminal, such as a PDA (Personal Digital Assistant) and a cellular phone, for example. The lists to be subject to the list matching are stored in storage means, such as a magnetic disk and semiconductor memory. The servers 621-62$k$ may be a work station, personal computer or other computer apparatus, for example. Typically, the network terminals 611-61$m$ and the servers 621-62$k$ may be the computer apparatus shown in FIG. 18.

Figure 8:
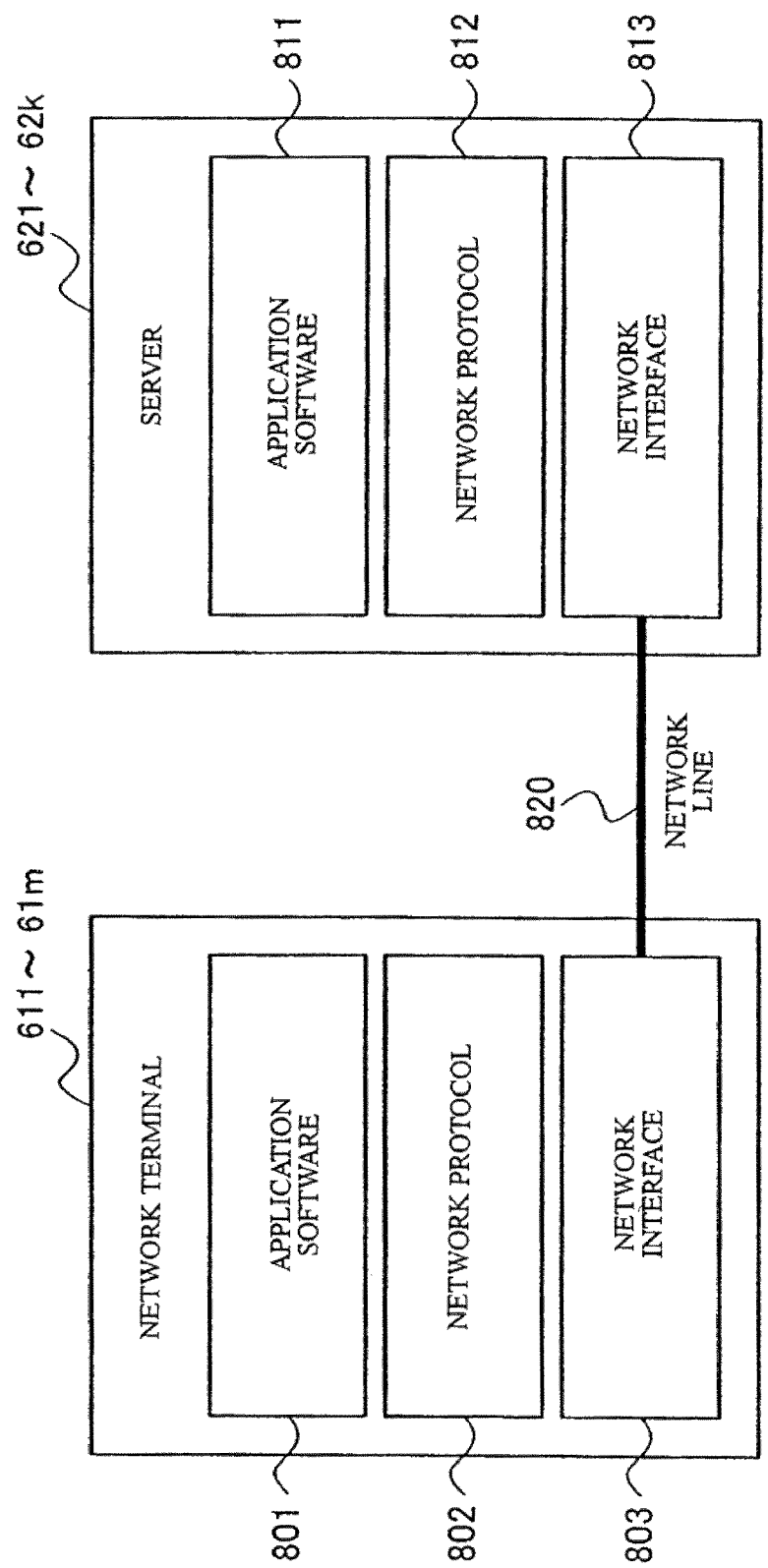
FIG. 8 shows a advantageous system configuration of a network terminal and server shown in FIG. 6.

FIG. 8 shows a advantageous system configuration of the network terminals 611-61$m$ and the servers 621-62$k$ shown in FIG. 6.

As shown in FIG. 8, each of the network terminals 611-61$m$ comprises application software 801, a network protocol 802 and a network interface 803, and each of the servers 621-62$k$ comprises application software 811, a network protocol 812 and a network interface 813.

The CPU 101 controlled by the application software 801, 811 performs processings including generation of a list to be processed, formation of a characteristic function polynomial from the list, addition of polynomials and reproduction of the list from the polynomial. And, the CPU 101 controls the network interface 803, 813 via the network protocol 802, 812. The network terminals 611-61$m$ and the servers 621-62$k$ communicate with each other by means of the network interface 803, 813 through a network line 820.

The CPU 101 controlled by the application software 801 of the network terminal 611-61$m$ implements a function of outputting a list of common items based on the polynomial reproduced according to the protocol described later through display means (liquid crystal display, for example) or audio output means provided in the network terminal 611-61$m$.

The system configuration of the network terminals 611-61$m$ and the servers 621-62$k$ according to this embodiment is not limited to that shown in FIG. 7. For example, a network OS (operating system) may be provided between the application software 801, 811 and the network protocol 802, 812.

Now, background arts for implementing the list matching according to the secret distribution in the system according to this embodiment will be described.

According to the common key cryptography system, one secret key is split into shares to be held by several servers. One famous common key cryptography system is the Shamir's (t, k) threshold cryptography scheme, in which one piece of secret information is split into shares to be held by k servers, and the original key can be restored by t of the k servers cooperating with each other. In this scheme, a (t−1)th polynomial on a field F is first defined as follows:

$$f(x)=f_0+f_1*x+f_2*x^2+\ldots+f_{t-1}*x^{t-1} \quad \text{(equation 1)}.$$

A secret information holder substitutes the secret information for $f_0$ in the equation 1, and determines randomly the remaining $f_k$. Then, the holder sends (k, f(k)) to the servers k as split information. Only after k pieces of split information is collected, coefficients of the polynomial (equation 1) can be uniquely determined, and thus, $f_0$ can be determined.

The Shamir's (t, k) threshold cryptography scheme is described in the following Literature 4.

Literature 4: Shamir, A., "How to Share a Secret", CACM 22, 1979.

The Oblivious Transfer (OT, hereinafter) is a protocol between two persons, an information sender S (sender) and a chooser C, in which the chooser selectively obtains predetermined several pieces of information among from a plurality of pieces of information held by the sender. Here, the following two requirements have to be satisfied.

(1) Privacy of the chooser: the sender cannot know which are chosen by the chooser.

(2) Privacy of the sender: the chooser cannot get information other than that he/she has chosen.

One basic OT is the 1-out-of-2-OT, in which the sender has two pieces of information, and the chooser chooses any one thereof. As a typical protocol for implementing the same, there is a protocol using the ElGamal encryption as described below. In the protocol described below, the information pieces held by the sender are denoted by $I_0$, $I_1$, and it is assumed that a chooser's selected value $b \in \{0, 1\}$, and [b]=NOT b.

1. S→C: Random number r.
2. C→S: $K_b$=gx, $K_{[b]}$=r/Ab.
3. S: Check that $K_0 * K_1$=r.
4. S→C: {EI1, IE2}, where EI1=($g^h$, $I_0 * K_0^h$), EI2=($g^h$, $I_1 * K_1^h$).
5. C: Decrypt $I_b$.

This protocol is described in the following Literature 5, for example.

Literature 5: Bellare, M. and Micali, S., "Non-interactive oblivious transfer and applications," in proc. CRYPTO'89, 1990.

The above-described basic OT requires encryption and decryption between the sender and the chooser. In particular, the sender has to encrypt all the information, and this is a heavy burden. Thus, it can be contemplated that a plurality of servers is provided between the sender and the chooser, and the secret information is distributed among the servers, thereby reducing the burden to the sender. The distributed OT is the one that implements the contemplation. A protocol of the distributed OT is as follows. Here, in the protocol described below, the k servers are denoted by $P_1, \ldots, P_k$.

1. S: Create a first order formula $F_Y(y)=(I_1-I_0)y+I_0$ and a (k−1)th order formula $F_X(x)$ with a constant term being 0, and define a bivariate polynomial $Q(x, y)=F_X(x)+F_Y(y)$.
2. S→$P_i$: Send Q(i, y) (Q denotes an univariate polynomial).
3. C: Create a (k−1)th order formula S(x) with a constant term being b.
4. C→$P_i$: Send a coordinate (i, S(i)).
5. $P_i$→C: Return Q(i, S(i)).
6. C: Receive Q(i, S(i)) from k servers to restore a (k−1)th order formula G(x)=Q(x, S(x)), thereby determining a value of G(0)=Q(0, S(0))=Q(0, b)=$F_Y$(b).

This protocol is described in the following Literature 6, for example.

Literature 6: Naor, M. and Pinkas, B., "Distributed Oblivious," in proc. of Asiacrypt, 2000.

Based on the technical background described above, in the network system configured as shown in FIGS. 6 to 8, the list matching is performed according to the protocol described below.

Figure 9:
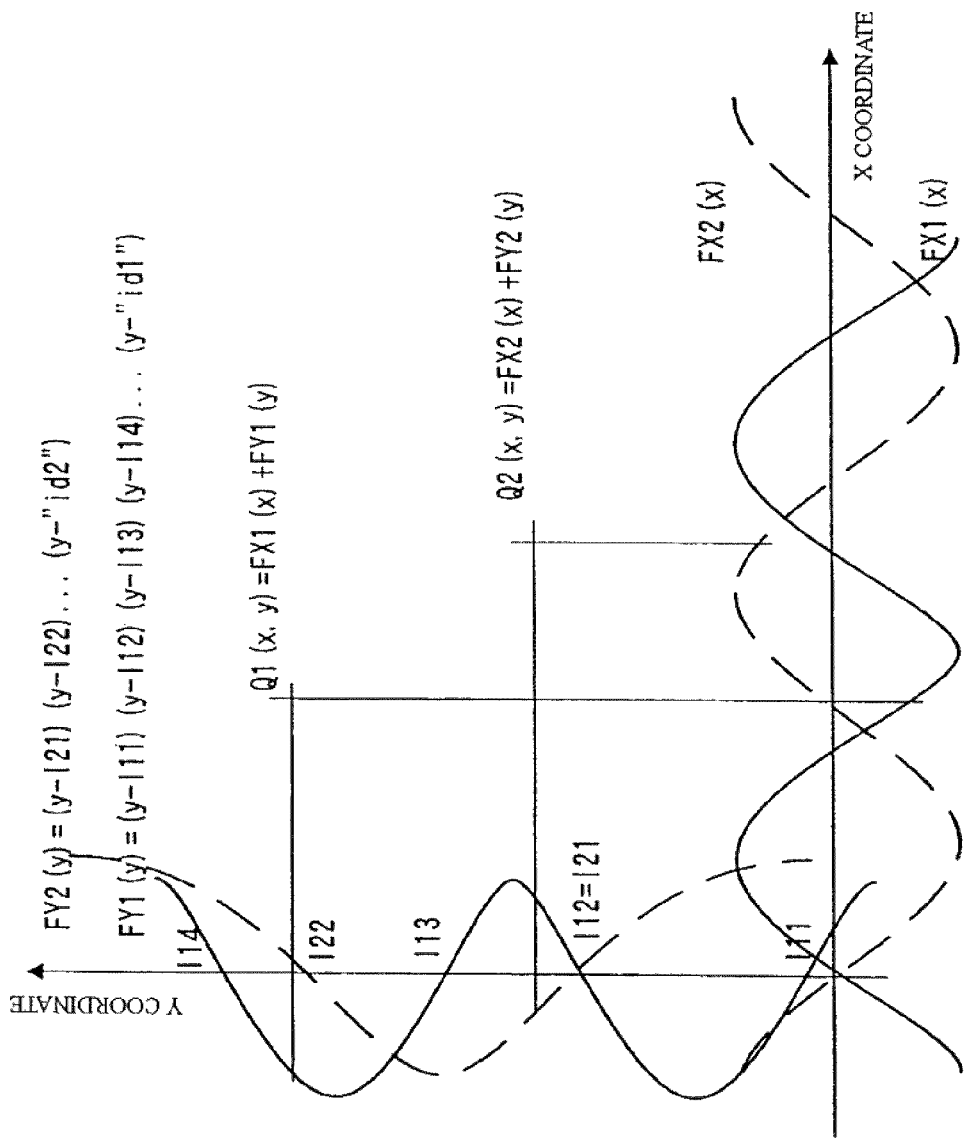
FIG. 9 is a diagram illustrating a polynomial $Q_i(x, y)=F_{Xi}(x)+F_{yi}(y)$.

1. Formation of characteristic function and transformation of the same into bivariate function:

The network terminal $61i$ ($i=1, \ldots, m$) composes an $(n+1)$th order polynomial $F_{Yi}(y)$ so that $F_{Yi}(l_{i,h})=0$ where $h=1, \ldots, n$. (Since the polynomial is of the $(n+1)$th order, it can has $(n+1)$ roots. The last one root is "$id_i$", which is a character string of the ID of $S_i$, and if the number of items in the list of the network terminal $61i$ is less than n, all of the remaining roots are assumed to be "$id_i$".) Then, a $(k-1)$th order polynomial $F_{Xi}(x)$ with a constant term being 0 is created, and a bivariate polynomial $Q_i(x, y)=F_{Xi}(x)+F_{Yi}(y)$ is defined (see FIG. 6). FIG. 9 is a diagram illustrating the polynomial $Q_i(x, y)=F_{Xi}(x)+F_{Yi}(y)$.

Figure 10:
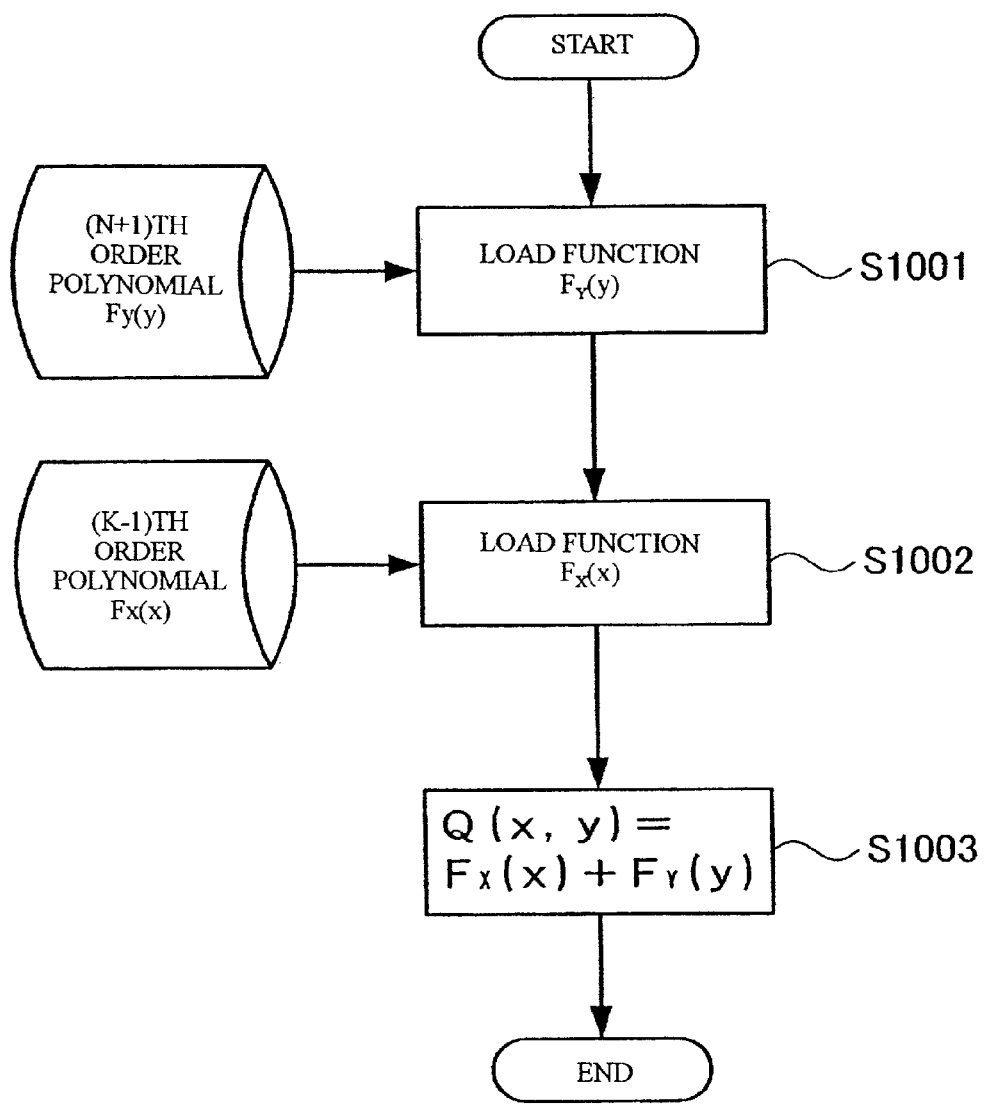
FIG. 10 is a flow chart for illustrating a method for forming a bivariate polynomial $Q_i(x, y)$.
Figure 11:
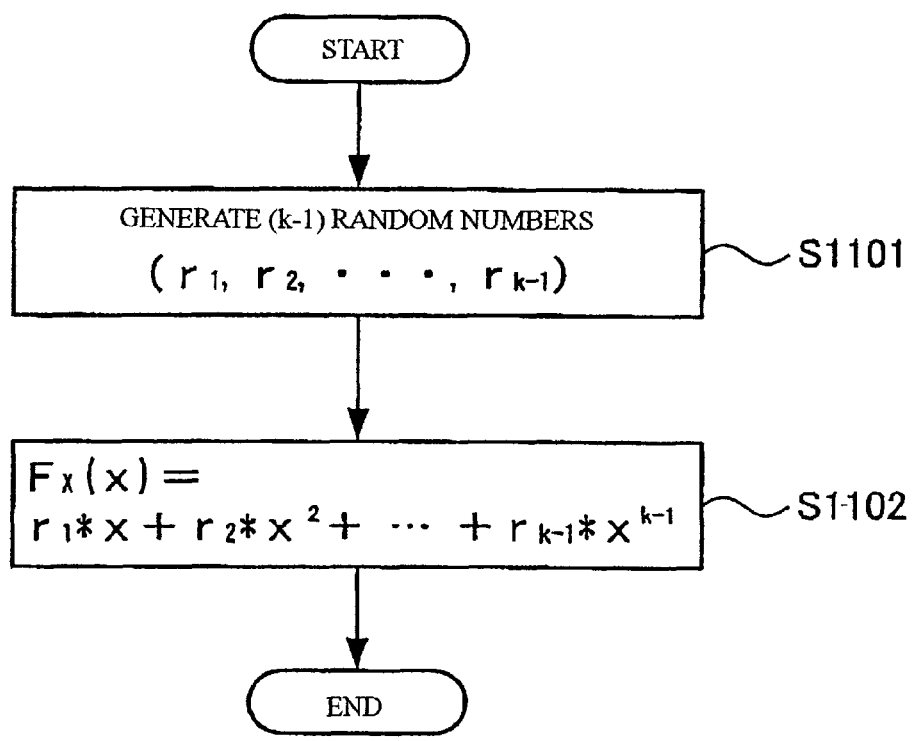
FIG. 11 is a flow chart for illustrating a method for forming a $(k-1)$th order polynomial $F_{Xi}(x)$.

FIG. 10 is a flow chart for illustrating a method for generating the bivariate polynomial $Q_i(x, y)$, and FIG. 11 is a flow chart for illustrating a method for generating the $(k-1)$th order polynomial $F_{Xi}(x)$.

Referring to FIG. 10, the $(n+1)$ the order polynomial $F_Y(y)$, which is previously stored in the main memory or the like, is read out (step 1001), and the $(k-1)$th order polynomial $F_X(x)$ is read out (step 1002). Then, the read-out polynomials $F_Y(y)$ and $F_X(x)$ are added to generate the bivariate polynomial $Q_i(x, y)$ (step 1003).

Referring to FIG. 11, $(k-1)$ random numbers are first generated (step 1101), and the random numbers are used to generate the $(k-1)$th order polynomial $F_X(x)=r_1*x+r_2*x^2+\ldots+r_{k-1}*x^{k-1}$ (step 1102).

2. Distribution of characteristic function among servers:

The network terminal $61i$ ($i=1, \ldots, m$) sends $Q_i(j, y)$ to the server $62j$ ($j=1, \ldots, k$) ($Q_i$ denotes a univariate polynomial) (see FIG. 6).

3. Addition of distributed values at servers:

The server $62j$ ($j=1, \ldots, k$) adds all the $Q_i(j, y)$ sent from the network terminals $61i$ ($i=1, \ldots, m$) (see FIG. 6). That is, $$Q^{(j)}(j, y)=\Sigma_i Q_i(j, y).$$

4. Creation of restoration functions:

Each network terminal $61i$ ($i=1, \ldots, m$) creates n $(k-n-2)$th order polynomials $S_{i,t}(x)$ with a constant term being $l_{i,t}$, where $t=1, \ldots, n$ (see FIG. 7).

5. Inquiry about distributed values on restoration functions to servers:

The network terminal $61i$ ($i=1, \ldots, m$) sends n coordinates $(j, S_{i,t}(j))$, where $t=1, \ldots, n$, to the server $62j$ ($j=1, \ldots, k$) (see FIG. 7).

6. Return of distributed values on restoration functions from servers:

The server $62j$ ($j=1, \ldots, k$) returns values of $Q^{(j)}(j, S_{i,t}(j))$, where $t=1, \ldots, n$, to the network terminal $61i$ ($i=1, \ldots, m$) (see FIG. 7).

7. Determination of correspondence of items:

The network terminal $61i$ ($i=1, \ldots, m$) restores the polynomial $Q^{(j)}(x, S_{i,t}(x))$ from the k polynomials $Q^{(j)}(j, S_{i,t}(j))$ @($j=1, \ldots, k$). Then, substituting $x=0$ for the polynomial, $Q^{(j)}(0, S_{i,t}(0))=Q^{(j)}(0, l_{i,t})=\Sigma_i F_{Yi}(l_{i,t})$, where $t=1, \ldots, n$ is calculated (see FIG. 7). With respect to a certain t, if $\Sigma_i F_{Yi}(l_{i,t})$ is 0, all the list holders commonly have the item $l_{i,t}$, or if $\Sigma_i F_{Yi}(l_{i,t})$ is not 0, the item $l_{i,t}$ is not common.

In this way, the polynomials describing the lists of the participants are distributed among the plurality of servers $621$-$62k$ and added to each other, and based on the result of the addition, the list of common parts can be obtained at the network terminals $611$-$61m$ of the respective participants. In the case of the list matching using the secret distribution according to the above-described protocol, initially, communications are established among the network terminals $611$-$61m$ holding the list to be subject to the list matching, and servers $621$-$62k$ to be used are determined.

With the network system described above, security is ensured in the following two respects.

First, the servers $621$-$62k$ for secret distribution cannot get information on the polynomials of the list holders and the resulting polynomial unless all of the k servers are in collusion with each other.

Second, the network terminals $611$-$61m$ cannot know the polynomials of the other participants.

Here, an illegal act using the network terminal $611$-$61m$ can be contemplated in which one registers a constant of 0 as the list-describing function of his/her own to try to know the common parts to the other participants without disclosing the actual list. However, such an illegal act can be detected by checking the order of the distributed polynomials at the servers $621$-$62k$ for secret distribution when the network terminals $611$-$61m$ register the polynomials with the servers $621$-$62k$ for secret distribution in a distribution manner.

According to the above-described protocol, each list holder i knows his/her own characteristic function $F_{Yi}(y)$. Therefore the list holder can retrieve the value of the sum function $\Sigma_i F_{Yi}(y)$ for a point y0 other than roots of his/her characteristic function (that is, a certain list item) and subtract the value of his/her characteristic function therefrom, thereby knowing whether the item is common to another list holder or not if a relation of $\Sigma_i F_{Yi}(y0)-F_{Yi}(y0)=0$ is satisfied. To prevent this, information other than the roots can be made to be invalid by multiplying the sum function by a factor of a random number as described below.

First, in the step 2 in the protocol described above, a random number $R_i$ (the same value for all the servers) is sent besides $Q_i(j, y)$.

In the step 3, besides adding the polynomials $Q_i(j, y)$, the random numbers $R_i$ sent from the network terminals $61i$ ($i=1, \ldots, m$) are added. That is, $$R^{(j)}=\Sigma_i R_i.$$

And, the former sum function is multiplied by a factor of the latter sum random number.

Involving such operations can prevent a list holder from retrieving any point other than the roots of his/her function.

According to this embodiment, each element in the list to be subject to the matching is a root of the characteristic function. Therefore, as a result of the addition of a plurality of characteristic functions, the sum characteristic function may have a root at a point where any of the characteristic functions has no root, as described above. Also as described above, in such a case, a one-way hash function can be used to distinguish, when reproducing the list, whether the root is produced from a list item or accidentally produced in the course of the addition of the polynomials.

However, according to this embodiment in which the peer-to-peer list matching is performed using secret distribution, the accidentally produced root is not a significant problem, and there is no need for the scheme using the hash function. This is because the list holders (participants), in principal, have to check whether the resulting function has a root at a point where their respective characteristic functions have a root. Thus, there is no problem at least in the case where two participants are involved.

In the case where three or more participants are involved, for example, in the case where a participant A has a list {A1, A2}, a participant B has a list {B1, B2} and a participant C has a list {C1, C2}, addition of the characteristic functions of A and B may, with a quite low probability, result in a sum function having a root C1. In this case, the C will erroneously determines that A and B also have the same element C1. The probability of occurrence of such an event can be determined as follows.

While the functions can be defined in any finite field, they are defined in the prime number field $Z_p$ herein for simplicity. Assuming that p is a prime number of the order of 512 bit, a character string of 64 length can be represented as a root. Here, if the number n of elements in the list is on the order of 15, the characteristic function is of 16th order. Each of the characteristic functions has the ID of the holder of the its corresponding list as a root, and therefore, is unique without overlapping with the others. Therefore, the probability that the sum function of the functions of A and B has a root at a certain value y0 other than the roots of the functions of A and B is on the order of $16/(2^{512})$, which can be substantially neglected.

Now, a system that usually performs the peer-to-peer list matching using the characteristic functions and, if a fault occurs, completes the list matching with the assistance of the TTP server will be described.

Figure 12:
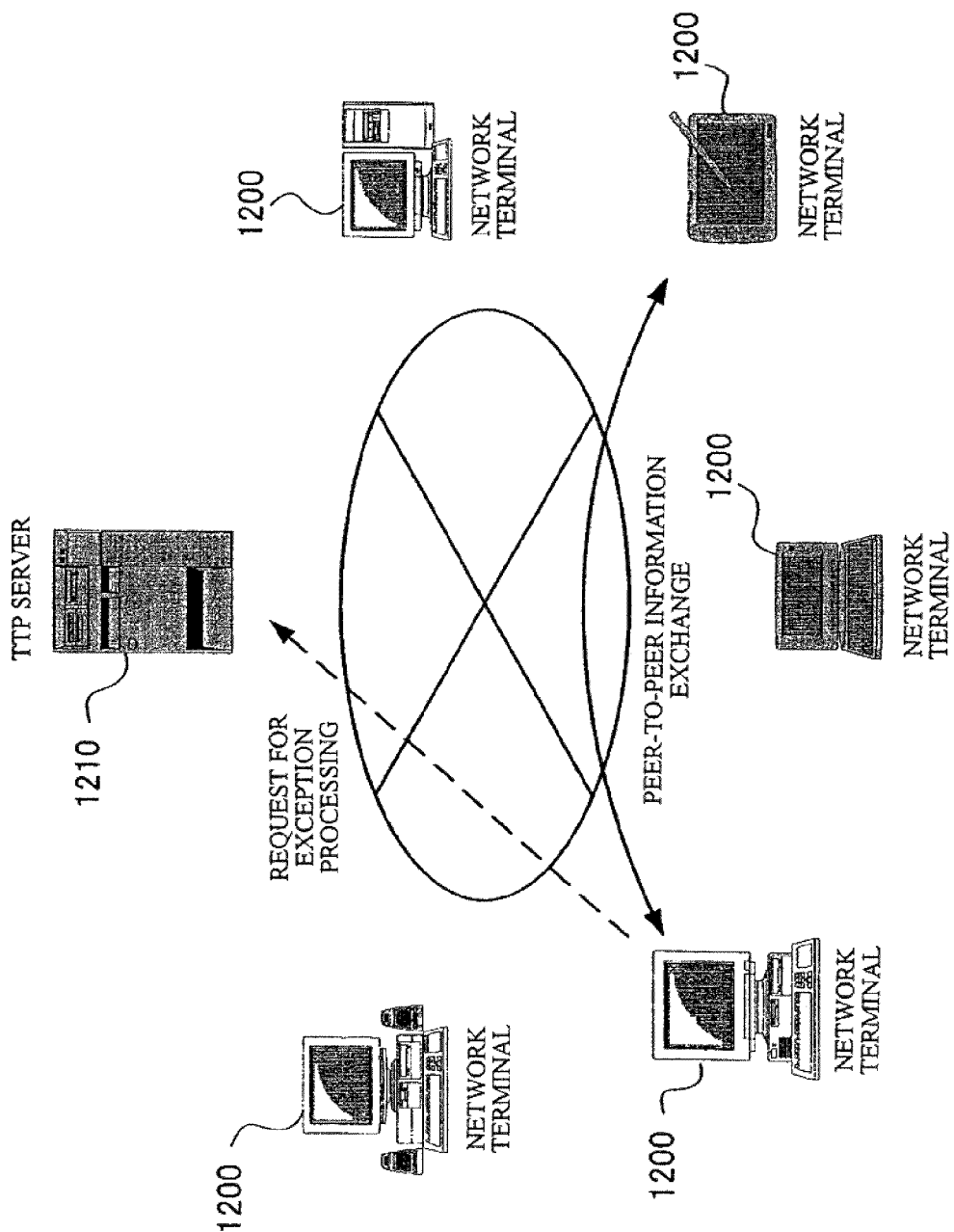
FIG. 12 shows a whole configuration of a system that performs the list matching according to a third embodiment.

FIG. 12 shows a whole configuration of such a system.

Referring to FIG. 12, with the network system according to this embodiment, the list matching can be implemented only through information exchange among network terminals 1200 each constituting a peer in the system. In addition, if a fault occurs in the information exchange among the network terminals 1200 (if a required information exchange is not accomplished or if erroneous information is exchanged), the problem can be solved by sending a request for an exception processing to a TTP server 1210.

Figure 13:
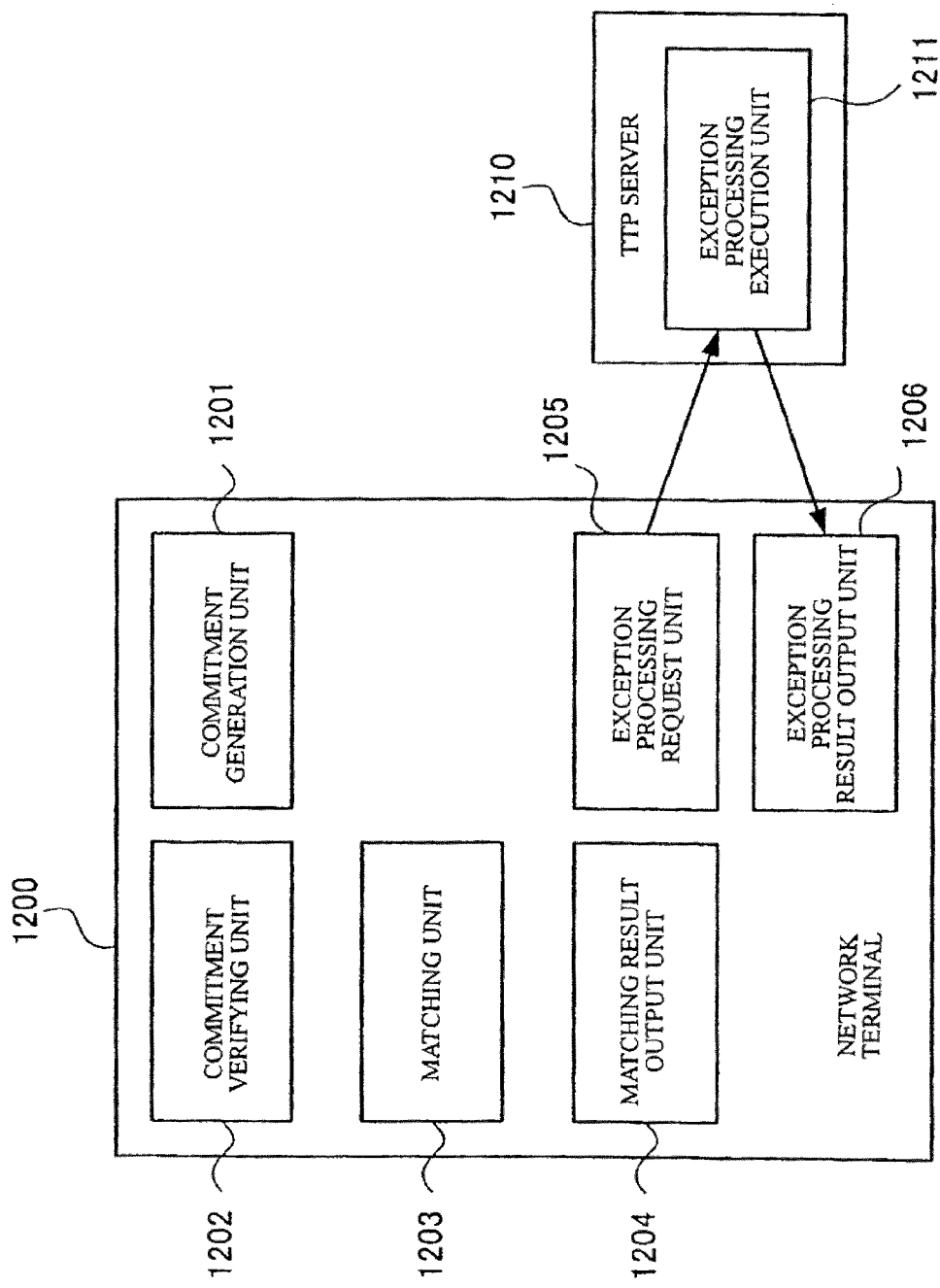
FIG. 13 shows a functional configuration of the network terminal and the TTP server according to the third embodiment.

FIG. 13 shows a functional configuration of the network terminal 1200 and the TTP server 1210 according to this embodiment.

The network terminal 1200 may be a computer apparatus, such as a personal computer, or an information communication terminal, such as a PDA (Personal Digital Assistant) and a cellular phone, for example (see FIG. 18). The lists to be subject to the list matching are stored in storage means, such as the hard disk 105 and main memory 103. Referring to FIG. 13, the network terminal 1200 comprises a commitment generation unit 1201 that generates a commitment and a commitment open value, which are public information, a commitment verifying unit 1202 that obtains and verifies the public information of another network terminal 1200, which is the partner in the list matching, a matching unit 1203 that performs the matching process on the commitment open value generated by the commitment generation unit 1201 and the commitment of the other network terminal 1200 verified in the commitment verifying unit 1202, a matching result output unit 1204 that outputs the result of the list matching, an exception processing request unit 1205 that requests the TTP server 1210 for a processing, and an exception processing result output unit 1206 that outputs the processing result obtained from the TTP server 1210.

The commitment generation unit 1201, the commitment verifying unit 1202, the matching unit 1203, the matching result output unit 1204, the exception processing request unit 1205 and the exception processing result output unit 1206 are virtual software blocks that are implemented by the program-controlled CPU 101 in the computer apparatus constituting the network terminal 1200. While not shown in particular, the network terminal 1200 further comprises a transmitter/receiver unit implemented by the program-controlled CPU 101 and the network interface 106.

The TTP server 1210 may be a work station, personal computer or other computer apparatus, for example (see FIG. 18), and comprises an exception processing execution unit 1211 that performs the list matching in response to the request from the exception processing request unit 1205 in the network terminal 1200.

The exception processing execution unit 1211 is a virtual software block that is implemented by the program-controlled CPU 101 in the computer apparatus constituting the TTP server 1210. Further, while not shown in particular, the TTP server 1210 further comprises a transmitter/receiver unit implemented by the program-controlled CPU 101 and the network interface 106.

Now, with respect to the case where the list matching is performed between predetermined two network terminals 1200 each constituting a peer in the network system shown in FIG. 12, for example, the processing and a flow of information will be described.

In the following description, when individual network terminals 1200 need to be identified, indices u, v will be assigned to the reference numeral. The same applies to components of the network terminals 1200. For example, they will be denoted as the network terminal 1200v, commitment generation unit 1201u, and the like.

Each network terminal 1200 has n pieces of data held in the database thereof. All pieces of data are assigned data numbers to be uniquely distinguished, and a set of the whole data numbers is denoted by L. A list of the data numbers of the n pieces of data held by a network terminal 1200u is represented, using an index u, as $L_u = \{\alpha_{u,1}, \ldots, \alpha_{u,n}\}$. The network terminal 1200u has a secret key $K_u$ for the public key cryptosystem. The TTP server 1210 has a secret key $K_T$ for the public key cryptosystem algorithm $E_T(\ )$. The TTP server 1210 has a function (exception processing execution unit 1211) of normally completing the protocol when a fault (exception) occurs as described above, which does not work in the normal process.

In this embodiment, the list matching (extraction of a common part among two lists) is defined as described below. That is, between arbitrary two network terminals 1200u and 1200v (u≠v), a common part $L_u \cap L_v$ to the secret lists thereof is shared. At this time, the followings are required:

(1) one of the network terminals does not reveal information except for the common part to the other; and (2) an illegal act that only one of the network terminals tries to know the common part is prevented.

Now, an algorithm executed in the network terminal 1200 and the TTP server 1210 will be described.

Figure 14:
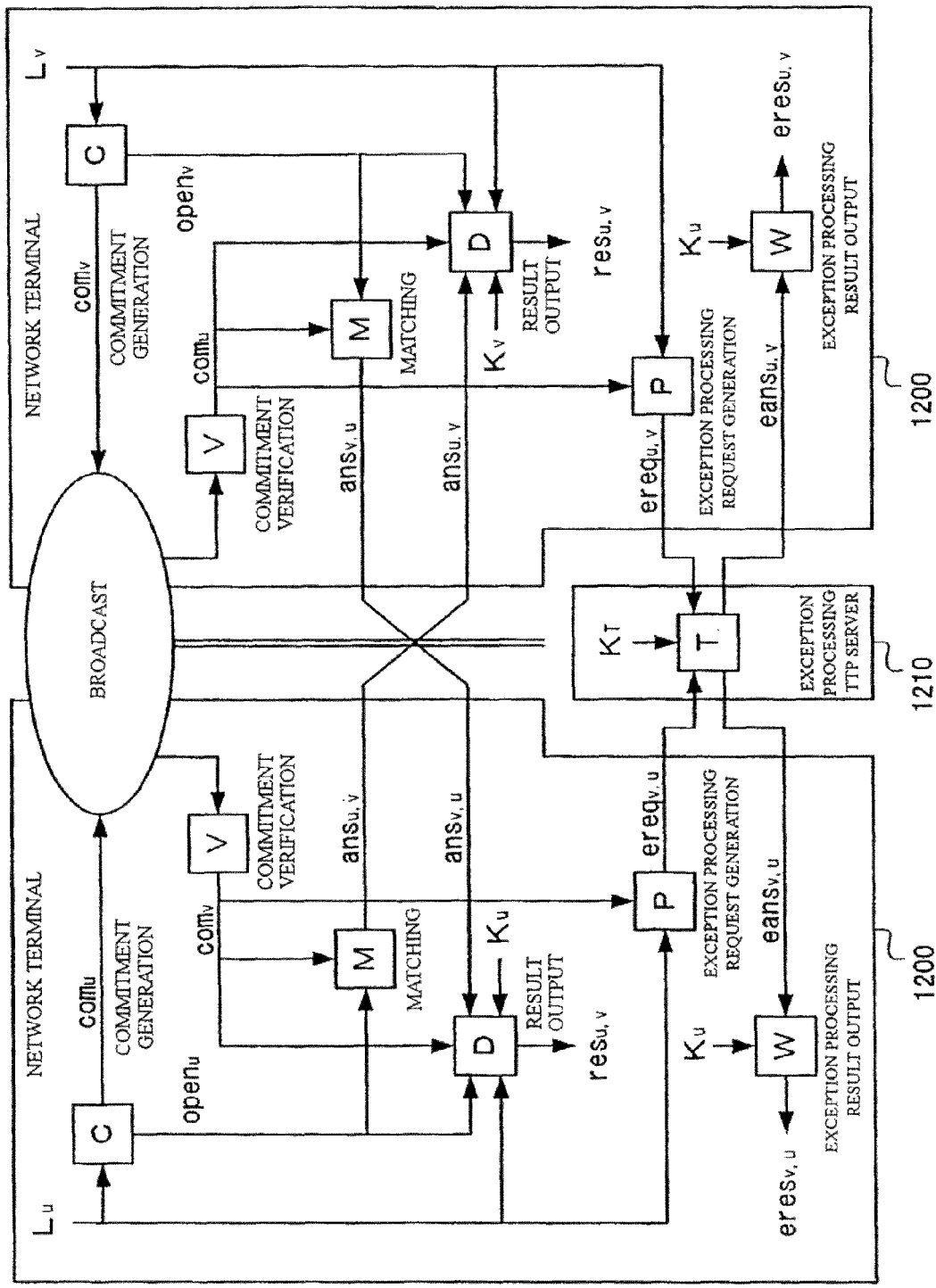
FIG. 14 illustrates an algorithm executed in the network terminal and the TTP server and a flow of information.

FIG. 14 illustrates the algorithm executed in the network terminal 1200 and the TTP server 1210 and a flow of information.

In this embodiment, to implement the list matching, the following six algorithm descriptions are used in the network terminal 1200.

$C(L_u)$: This is a commitment generation algorithm executed in the commitment generation unit 1201u. When the list $L_u$ held by the network terminal 1200u is input, a commitment $com_u$ and a commitment open value $open_u$ are output.

$V(com_v)$: This is a commitment verifying algorithm executed in the commitment verifying unit 1202u. When a commitment $com_v$ from the network terminal 1200v is input, a verification result $\{0, 1\}$ is output (an input resulting in the output of "1" will be referred to as a "legal commitment", hereinafter).

$M(open_u, com_v)$: This is a matching algorithm executed in the matching unit 1203u. When the commitment open value $open_u$ of the network terminal 1200u and a legal commitment $com_v$ of the network terminal 1200v are input, an answering message $ans_{u,v}$ is output.

$D(\text{ans}_{v,u}, \text{com}_v, L_u, K_u, \text{open}_u)$: This is a result output algorithm executed in the matching result output unit 1204$u$. When the answering message $\text{ans}_{v,u}$ from the network terminal 1200$v$ to the network terminal 1200$u$, the legal commitment $\text{com}_v$, and the list $L_u$, the secret key $K_u$ and the commitment open value $\text{open}_u$ of the network terminal 1200$u$ are input, a common part to the lists $L_u$ and Lv expressed by the following formula 1 (or also denoted as $L_{u,v}$) or an error message is output (an input $\text{ans}_{v,u}$ resulting in the output of the common part will be referred to as a "legal answering message", hereinafter).

$$\tilde{L}_{u,v}(=L_u \cap L_v)$$ (Formula 1)

$P(\text{com}_v, L_u)$: This is an exception processing request generation algorithm executed in the exception processing request unit 1205$u$. When the legal commitment $\text{com}_v$ of the network terminal 1200$v$ and the list $L_u$ of the network terminal 1200$u$ are input, an exception processing request message $\text{ereq}_{v,u}$ is output.

$W(\text{eans}_{v,u}, K_u)$: This is an exception processing result generation algorithm executed in the exception processing result output unit 1206$u$. When an exception request answering message $\text{eans}_v$, is input, the common part $L_{u,v}(=L_u \cap L_v)$ to the lists $L_u$ and Lv is output.

In addition, in this embodiment, the following algorithm executed in the exception processing execution unit 1211 in the TTP server 1210 is used.

$T(\text{ereq}_{v,u}, K_T)$: This is an exception processing algorithm. When the exception processing request message $\text{ereq}_{v,u}$ and the secret key $K_T$ of the TTP server 1210 are input, the exception processing answering message $\text{eans}_{v,u}$ or error is output (the exception processing request message $\text{ereq}_{v,u}$ resulting in the output of the exception processing answering message $\text{eans}_{v,u}$ will be referred to as a "legal exception processing request message", hereinafter).

Details of these algorithms will be described later.

According to the definitions of the list matching and algorithms described above, the list matching according to this embodiment can be formulated as follows.

1. Servers Open Commitments

Initially, the commitment generation unit 1201 of the network terminal 1200 uses the commitment generation algorithm C to generate the commitment and commitment open value ($\{\text{com}_u, \text{open}_u\}=C(L_u)$, in the case of the network terminal 1200$u$) of the list thereof ($L_u$, in the case of the network terminal 1200$u$), and broadcasts the generates commitment (com) to the other network terminals 1200, that is, whole of the network system. The commitment open value (open) is kept secret.

The commitment is opened to all the network terminals 1200. The size of the commitment is independent of the number of the network terminals 1200 involved in the system, and therefore, the commitment needs not be changed when another network system 1200 is added to the system. Thus, the commitment may be provided to the network terminals 1200 in any manner so far as the network terminals can arbitrarily obtain the commitment, rather than by the network terminals 1200 exchanging the commitments with each other by broadcasting. For example, the commitment may be registered with a database provided in the network and opened to the public, or such a database may be stored in a mass recording medium, such as CD-ROM (Compact Disc Read Only Memory) and DVD-ROM (Digital Versatile Disc Read Only Memory), and distributed.

2. The following processes are performed between arbitrary network terminals 1200. For simplicity, a process flow for the network terminals 1200$u$ and 1200$v$ will be described. (b) is a procedure needed only when exception occurs. As described below, since both of the network terminals 1200$u$ and 1200$v$ perform the similar processes, the network terminals 1200$u$ and 1200$v$ initially communicate with each other, and then, the processes are started after the two ascertain that the list matching is to be performed between them.

(a) Normal Process i. Verification of Commitment

The commitment verifying unit 1202$u$ of the network terminal 1200$u$ uses the commitment verifying algorithm V on the commitment $\text{com}_v$ of the network terminal 1200$v$, which is the partner in the list matching, to verify whether the commitment results in the relation of $V(\text{com}_v)=1$, thereby confirming that the commitment $\text{com}_v$ is the legal commitment. If the commitment $\text{com}_v$ results in the relation of $V(\text{com}_v)=0$, the subsequent process is not performed on the network terminal 1200$v$ (therefore, no list exchange occurs). The network terminal 1200$v$ also performs the similar process on the commitment $\text{com}_u$.

ii. Generation of Answering Message

The matching unit 1203$u$ of the network terminal 1200$u$ uses the commitment open value $\text{open}_u$ thereof and the matching algorithm M on the legal commitment $\text{com}_v$ of the network terminal 1200$v$ to compute an answering message $\text{ans}_{u,v}=M(\text{open}_u, \text{com}_v)$, and transmits the answering message to the network terminal 1200$v$, which is the partner in the list matching. The network terminal 1200$v$ also performs the similar process on the commitment $\text{com}_u$.

iii. Result Output

The matching result output unit 1204$u$ of the network terminal 1200$u$ receives the answering message $\text{ans}_{v,u}$ from the network terminal 1200$v$. If the answering message $\text{ans}_{v,u}$ is not received, the exception processing process described later is performed. The matching result output unit 1204$u$ uses the list $L_u$, secret key $K_u$ and commitment open value $\text{open}_u$ thereof, the legal commitment $\text{com}_v$ of the network terminal 1200$v$ and the result output algorithm D on the answering message $\text{ans}_{v,u}$ received from the network terminal 1200$v$ to compute the result $\text{res}_{v,u}=D(\text{ans}_{v,u}, \text{com}_v, L_u, K_u, \text{open}_u)$. If the answering message $\text{ans}_{v,u}$ is the legal answering message, the result $\text{res}_{v,u}$ is the common part ($L_u \cap L_v$) among the list $L_u$ of the network terminal 1200$u$ and the list Lv of the network terminal 1200$v$. If the result $\text{res}_{v,u}$ is an error, the exception processing process is performed. The network terminal 1200$v$ also performs the similar process on the answering message $\text{ans}_{u,v}$.

(b) Exception Processing Process i. Exception Processing Request

If an exception that the network terminal 1200$u$ cannot compute the common part to the lists occurs, that is, if the answering message $\text{ans}_{v,u}$ is not transmitted from the network terminal 1200$v$ or an erroneous answering message $\text{ans}_{v,u}$ is transmitted therefrom, the result output unit 1205$u$ of the network terminal 1200$u$ uses the list $L_u$ thereof, the legal commitment $\text{com}_v$ of the network terminal 1200$v$ and the exception processing request generation algorithm P to compute the exception processing request message $\text{ereq}_{v,u}=P(\text{com}_v, L_u)$ and transmits the same to the TTP server 1210.

ii. Exception Processing

After receiving the exception processing request message $\text{ereq}_{v,u}$, the TTP server 1210 confirms that the exception occurs through a prescribed procedure. If the exception is not confirmed, the TTP server returns an error to the network terminal 1200$u$. If the exception is confirmed, the exception processing execution unit 1211 uses the exception processing algorithm T and the secret key $K_T$ to compute the exception processing answering message $eans_{v,u}=T$ ($ereq_{v,u}$, $K_T$). Then, the TTP server 1210 transmits the computed exception processing answering message $eans_{v,u}$ to the network terminal 1200u.

iii. Exception Processing Result Output

The exception processing result output unit 1206u of the network terminal 1200u uses, as the inputs, the exception processing answering message $eans_{v,u}$ received from the TTP server 1210 and the secret key $K_T$ of the network terminal 1200u to compute the exception processing result $eres_{v,u}=W$ ($eans_{v,u}$, $K_u$), and outputs the same. The exception processing result $eres_{v,u}$ is the common part ($L_u \cap L_v$) among the list $L_u$ of the network terminal 1200u and the list Lv of the network terminal 1200v.

In the operation described above, by opening the commitment to the list thereof, each network terminal 1200 can assure the other network terminal that it does not falsify the list in the list matching. In addition, the commitment includes information that enables the TTP server 1210 to compute the common part to the lists for preventing one of the network terminals from suffering a disadvantage when the exception occurs. At the start of the normal process, each network terminal 1200 can use the commitment verifying algorithm V to check that "the commitment is properly configured, and if anything should occur, the problem can be solved by the TTP server 1210".

In addition, to make the falsification of the list difficult, the answering message is computed using the opened commitment as the input. Therefore, information about the list of the network terminal 1200, which is the partner in the list matching, cannot be illegally obtained by list falsification. Furthermore, it is provided that, when one of the network terminals 1200 arbitrarily interrupts the protocol without transmitting the answering message or transmits a message computed illegally, the TTP server 1210 can compute the common part to the lists based on the information included in the commitment and exception processing request message. Thus, one network terminal 1200 cannot exclusively get the information about the common part to the lists in an illegal manner.

Now, a protocol for implementing the list matching in the system according to this embodiment will be described.

First of all, parameters used in this protocol will be described.

Reference symbol $G_q$ denotes a group of an order q (q denotes a prime number) for which the Decisional Diffice-Hellman (DDH) assumption holds true, and reference symbols g and h denote random elements of the group $G_q$. Here, the value of $\log_g h$ is unknown. Reference symbol $H(\bullet)$ denotes an ideal one-way hash function, and the commitment for $\alpha \in Z_q$ is expressed as $\pi(\alpha, r) = g^\alpha h^r$ ($r \in_R Z_q$). Here, $x \in_R G$ means that "x is an element randomly extracted from the group G". The ElGamal encryption $E_y(m, r)$ on the group $G_q$ is defined as follows:

$$E_y(m, r) = (g^r, my^r) \ (r \in_R Z_q).$$

In this equation, reference symbol m denotes a plaintext (message) and reference symbol y denotes a public key. Decryption by the secret key associated with the public key y is expressed as $D_y$ (that is, $D_y(E_y(m, r)) = m$). It is known that, if m is limited to the elements of the group $G_q$, the encryption is semantically secure under the DDH assumption. The ElGamal encryption has the following characteristics:

$$(E_y(m, r))^k = (g^r)^k, (my^r)^k) = E_y(m^k, kr); \text{ and}$$

$$E_y(m, r) \times E_y(m', r') = (g^r g^{r'}, my^r(m'y^{r'})) = E_y(mm', r+r').$$

Hereinafter, E(m, r) will be appropriately expressed as E(m) by omitting the random number r as required in the context.

The protocol implemented in this embodiment is defined on any group GF(q) for which the discrete logarithm problem becomes difficult in terms of computational complexity.

Specific examples of the group GF(q) include:

(1) a group formed on a prime field of an order p: a group GF(q) formed with a generator g, g denoting an element of the order q on the finite field $Z_p$, and p denoting a large prime number satisfying a relation of q|p−1;

(2) a group formed by associating a multiplication on the prime field of the order p with an addition on a curve, such as an elliptic curve, on any finite field; and (3) a group formed by substituting a power of a prime number p' for the prime number p and performing an operation on an extension field GF(p') instead of a remainder operation with a modulus of the prime number p.

Now, an existing basic protocol used in this embodiment will be described.

OPE using the ElGamal encryption:

It is assumed that the information exchange is accomplished between two parties A and B. The public key of the party A is denoted by y.

It is assumed that the party A has a secret value $\alpha (\in Z_q)$, and the party B has a secret polynomial $f_B(x)$ expressed as the following formula 2.

$$f_B(x) = \Sigma_{i=0}^n b_i x^i \ (\text{mod } q) \tag{Formula 2}$$

This protocol has properties:

the party A can get a value $g^{f_B(\alpha)}$ without the party B knowing the value $\alpha$; and the party A cannot get any information about the polynomial $f_B(x)$ except for the value $g^{f_B(\alpha)}$.

Contents of the protocol will be described below.

1. The party A ElGamal-encrypts a value expressed as the following formula 3 into a value expressed as the following formula 4 using a random number $r_i (\in R Z_q)$, where i=1, ..., n.

$$g^{\alpha^i} \tag{Formula 3}$$

$$c_i = E_y(g^{\alpha^i}, r_i) \tag{Formula 4}$$

The party A transmits the values $c_1, \ldots, c_n$ to the party B.

2. The party B selects a random number $r0 (\in_R Z_q)$ and performs the computation expressed as the following formula 5.

$$\hat{c} = E_y(g^{b_0}, r_0) \times \prod_{i=1}^n c_i^{b_i} = E_y(g^{f_B(\alpha)}, \tau) \tag{Formula 5}$$

where $$\tau = r_0 + \Sigma_{i=1}^n b_i r_i \ (\text{mod } q)$$

The party B transmits a cryptogram $$\hat{c} \tag{Formula 6}$$

(also expressed as ˆc, hereinafter) to the party A.

3. The party A decrypts the cryptogram ˆc to obtain the value $g^{f_B(\alpha)}$.

Certification Protocol 1:

Reference symbols $m_0$, $m_1$ denote elements of the group $G_q$, and a cryptogram expressed as $\hat{c}_1 = (c_1, c_2) = E_y(m_1, \beta) = (g^\beta, m_1 y^\beta)$ is the ElGamal cryptogram of the element $m_1$ with the public key y. Here, it is to be certified that with respect to common inputs (g, y, $m_0$, ˆc), a discrete logarithm $\alpha$ of the plaintext $m_1$ corresponding to the cryptogram $\hat{c}$ to the plaintext $m_0$ is known. That is, a non-interactive certification of knowledge expressed as $(e, s, t) = PKa\{(\alpha, \beta): (c_1 = g\beta) \wedge (c_2 = m_1 y\beta) \wedge (m_1 = m_0\alpha)\}$ can be configured in the following manner.

1. Select random numbers $r_1, r_2 \in_R Z_q$.
2. Compute the non-interactive certification $(e, s, t)$ using the following formulas 7.

$$e = H(g\|y\|m_0\|\hat{c}\|g^{r_1}\|y^{r_1}m_0^{r_2})$$

$$s = r_1 - e\beta$$

$$t = r_2 - e\alpha \pmod{q} \quad \text{(Formula 7)}$$

The verifier accepts the certification when the following formula 8 holds true.

$$e = H(g\|y\|m_0\|\hat{c}\|g^s c_1^e\|y^s m_0^t c_2^e) \quad \text{(Formula 8)}$$

Certification Protocol 2:

Reference symbols $m_1, m_2, m'_1, m'_2$ denote elements of the group $G_q$, and cryptograms expressed as $$\hat{c}_1 = (c_{1,1}, c_{1,2}) = E_y(m'_1, \beta_1) = (g^{\beta_1}, m'_1 y^{\beta_1})$$

$$\hat{c}_2 = (c_{2,1}, c_{2,2}) = E_y(m'_2, \beta_2) = (g^{\beta_2}, m'_2 y^{\beta_1})$$

are the ElGamal cryptograms of the elements $m'_1, m'_2$, respectively, with the public key y. Here, it is to be certified that with respect to common inputs $(g, y, m_1, m_2, \hat{c}_1, \hat{c}_2)$, discrete logarithms of the plaintexts $m'_1, m'_2$ corresponding to the cryptograms $\hat{c}_1, \hat{c}_2$ to the plaintexts $m_1, m_2$, respectively, are equal to each other. That is, a non-interactive certification of knowledge expressed as $(e, s, t, u) = PK\{(\alpha, \beta_1, \beta_2): \{(c_{i,1} = g^{\beta_i}) \wedge (c_{i,2} = m'_i y^{\beta_i}) \wedge (m'_1 = m_i^\alpha)\}_{i=1,2}\}$ can be configured in the following manner.

1. Select random numbers $r_1, r_2, r_3 \in_R Z_q$.
2. Compute the non-interactive certification $(e, s, t, u)$ using the following formulas 9.

$$e = H(g\|y\|m_1\|m_2\|\hat{c}_1\|\hat{c}_2\|g^{r_1}\|g^{r_2}\|y^{r_1}m_1^{r_3}\|y^{r_2}m_2^{r_3})$$

$$s = r_1 - e\beta_1$$

$$t = r_2 - e\beta_2$$

$$u = r_3 - e\alpha \pmod{q} \quad \text{(Formula 9)}$$

The verifier accepts the certification when the following formula 10 holds true.

$$e = H(g\|y\|m_1\|m_2\|\hat{c}_1\|\hat{c}_2\|g^s c_{1,1}^e\|g^t c_{2,1}^e\|y_1^s m_1^u c_{1,2}^e\|y_2^t m_2^u c_{2,2}^e) \quad \text{(Formula 10)}$$

A non-interactive certification expressed as $PK\{(\alpha, \{\beta_i\}_{i=1}^n): \{(c_{i,1} = g\beta^i) \wedge (c_{i,2} = m'_i y\beta^i) \wedge (m'_i = mi\alpha)\}_{i=1}^n\}$ can be readily configured by expanding this approach.

Certification Protocol 3:

Reference symbols $m_0$ denotes an element of the group $G_q$, and a cryptogram expressed as $\hat{c}i = (c_{i,1}, c_{i,2}) = (g\beta^i, m_i y\beta^i)$ is the ElGamal cryptogram of the element $m_i$ with the public key y. Here, it is to be certified that with respect to common inputs $(g, y, m_0, \hat{c}_1, \ldots, \hat{c}_n)$, there exists a discrete logarithm $\alpha$ satisfying a function expressed as the following formula 11, without disclosing the discrete logarithm $\alpha$.

$$(m_0, D_y(\hat{c}_1), D_y(\hat{c}_2), \ldots, D_y(\hat{c}_n)) = (m_0, m_0^\alpha m_0^{\alpha}, \ldots, m_0^{\alpha^n}) \quad \text{(Formula 11)}$$

That is, a non-interactive certification of knowledge expressed as the following formula 12 can be configured in the following manner. Here, for simplicity, it is assumed that $(c_{0,1}, c_{0,2}) = E_y(m_0, 0) = (1, m_0)$, $\beta_0 = 0$.

$$(e, \{s_i\}_{i=1}^n, t) = PK\{(\alpha, \{\beta_i\}_{i=1}^n): \{(c_{i,1} = g^{\beta_i}) \wedge (c_{i,2} = m_i y^{\beta_i}) \wedge (m_i = m_0^{\alpha^i})\}_{i=1}^n\} \quad \text{(Formula 12)}$$

1. Select random numbers $r_1, r_2 \in_R Z_q$.
2. Compute the non-interactive certification $(e, s_1, \ldots, s_n, t)$ using the following formulas 13.

$$e = H(g\|y\|m_0\|\{\hat{c}_i, g^{r}c_{i,1}^w, y^r c_{i,2}^w\}_{i=1}^n)$$

$$s_i = r_i + e(\beta_{i-1}\alpha - \beta_i) \pmod{q} (i=1, \ldots, n)$$

$$t = w - e\alpha \pmod{q} \quad \text{(Formula 13)}$$

The verifier accepts the certification when the following formula 14 holds true.

$$e = H(g\|y\|m_0\|\{\hat{c}_i, g^{s_i}(c_{i-1,1})^t c_{i,1}^e, y^{s_i}(c_{i-1,2})^t c_{i,2}^e\}_{i=1}^n) \quad \text{(Formula 14)}$$

Figure 15:
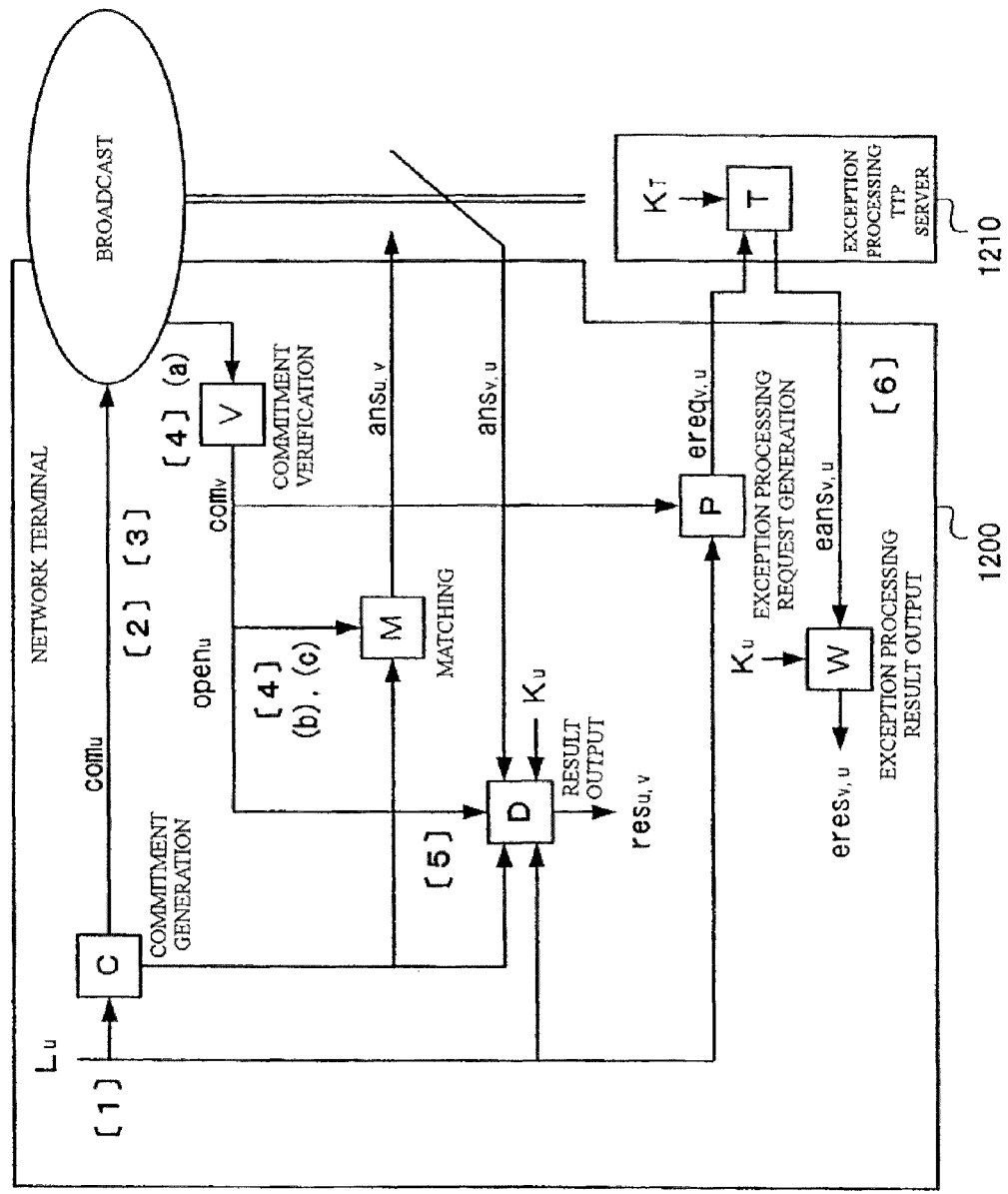
FIG. 15 illustrates a protocol of the list matching according to this embodiment.

FIG. 15 illustrates a protocol of the list matching according to this embodiment, which is implemented by the basic protocol described above. The following description will be made with reference to FIG. 15. Here, numbers shown within parentheses in this drawing correspond to the numbers in the following procedure, respectively.

[1] For the list $L_u = \{\alpha_{u,1}, \ldots, \alpha_{u,n}\}$, the network terminal 1200u computes a characteristic function expressed as the following formula 15.

$$f_u(x) = \Pi_{\alpha_{u,1} \in L_A}(\alpha_{u,1} - x)/\alpha_{u,1} \pmod{q} \quad \text{(Formula 15)}$$

Here, the characteristic function expressed as the following formula 16 has a constant term of 1 and all the elements of the list $L_u$ as the roots.

$$f_u(x) = 1 + \Sigma_{i=1}^n a_{u,1} x^1 \quad \text{(Formula 16)}$$

[2] The network terminal 1200u creates a commitment $\{c_{u,1} = g^{a_{u,1}} h^{b_{u,1}}\}_{l=1}^n$ for an efficient $\{a_{u,1}\}_{l=1}^n$. Here, the following formula 17 is defined.

$$w_u(x) = \Sigma_{l=1}^n b_{u,1} x^1 \pmod{q} \quad \text{(Formula 17)}$$

[3] By applying the OPE approach using the ElGamal encryption, according to the OPE adopting the item $\alpha_{u,i}$ in the list $(\alpha_{u,i} \in L_u)$ as the input, the network terminal 1200u verifies whether the item $\alpha_{u,i}$ is a root of the polynomial $f_v(x)$ of the network terminal 1200v. For this purpose, the following processings are performed on all the items $\alpha_{u,i} \in L_u$ $(i=1, \ldots, n)$.

(a) Select elements $g_{u,i}, h_{u,i} \in G_q$. Here, values $t_g^{(u,i)} = \log_g g_{u,i}$ and $t_h^{(u,i)} = \log_h h_{u,i}$ are only known to the network terminal 1200u.

(b) Compute the following formulas 18 (reference symbol $y_T$ denotes the public key of the TTP server 1210).

$$\{\psi_g^{(u,i,j)} = E_{y_u}(g_{u,i}^{\alpha_{u,i}^j})\}_{j=1}^n$$

$$\{\psi_h^{(u,i,j)} = E_{y_u}(h_{u,i}^{\alpha_{u,i}^j})\}_{j=1}^n$$

$$\{\psi_c^{(u,i,j)} = E_{y_u}(c_{u,i}^{\alpha_{u,i}^j})\}_{j=1}^n$$

$$\psi_g^{(u,i)} = E_{y_T}(g^{\alpha_{u,i}}) \quad \text{(Formula 18)}$$

In addition, a certification $pk_{u,i,1}$ for showing that the computations have been properly conducted is created. $\phi_t^{(u, \bullet, \bullet)}$, which can be reproduced at the TTP server 1210, enables verification that the TTP server 1210 can solve a problem when the problem occurs.

(c) Create a certification $pk_{u,i,2}$ for showing that the item $\alpha_{u,i}$ satisfies the equation $f_u(\alpha_{u,i}) = 0$. This certification is effected by using the following formula 19 to certify of the knowledge of the discrete logarithm for h in the following formula 20.

$$\{\psi_c^{(u,i,j)}\}_{j=1}^n \quad \text{(Formula 19)}$$

$$D_{y_u}(g \times \Pi_{j=1}^n \psi_c^{(u,i,j)}) = g^{f_u(\alpha_{u,i})} h^{w_u(\alpha_{u,i})} \quad \text{(Formula 20)}$$

(d) Compose public information $d_{u,i}$ associated with the item $\alpha_{u,i}$ as expressed by the following formula 21.

$$d_{u,i}=(g_{u,i},h_{u,i},\{\psi_g^{(u,i,j)}\}_{j=1}^n,\{\psi_h^{(u,i,j)}\}_{j=1}^n,\{\psi_c^{(u,i,j)}\}_{j=1}^n,\\ \psi_t^{(u,i)},pk_{u,i,1},pk_{u,i,2})$$ (Formula 21)

Thus, the commitment $com_u$ to be opened is expressed a the following formula 22.

$$com_u=(\{c_{u,1}\}_{l=1}^n\|\{d_{u,i}\}_{i=1}^n)$$ (Formula 22)

[4] The network terminal 1200$v$, which has received the commitment $com_u$ of the network terminal 1200$u$, performs the following processings, where $i=1, \ldots, n$.

(a) Verify the certifications $pk_{u,i,1}$ and $pk_{u,i,2}$ included in the public information $d_{u,i}$.

(b) Using the following formulas 23, compute $\phi_g^{(u,v,i)}$ and $\phi_h^{(u,v,i)}$.

$$\varphi_g^{(u,v,i)} = E_{y_u}(g_{u,i}) \times \prod_{j=1}^n (\psi_g^{(u,v,j)})^{a_{v,j}} = E_{y_u}(g_{u,i}^{f_u(\alpha_{u,i})})$$ (Formula 23)

$$\varphi_h^{(u,v,i)} = \prod_{j=1}^n (\psi_h^{(u,v,j)})^{b_{v,j}} = E_{y_u}(h_{u,i}^{w_u(\alpha_{u,i})})$$

(c) Raise $\phi_g^{(u,v,i)}$ to $\xi_1^{(u,v,i)}$-th power to conceal the information not involved in determining whether the item $\alpha_{u,i}$ is a root of the polynomial $f_v(\ )$, as expressed by the following formula 24.

$$\mu_g^{(u,v,i)}=(\phi_g^{(u,v,i)})^{\xi_1^{(u,v,i)}}$$ (Formula 24)

$$(h_{u,i})^{\xi_2^{(u,v,i)}}(\xi_2^{(u,v,i)}\in Z_q)$$ (Formula 25)

On the other hand, information that enables the network terminal 1200$u$ to verify, using only the opened commitment $com_v$, whether these processings are properly conducted is created. At first, the function $\phi_h^{(u,v,i)}$ is multiplied by a function expressed by the following formula 25 to conceal the information associated with $w_v(\alpha_{u,i})$. Then, a certification showing that these processings are properly conducted is created as expressed by the following formulas 26.

$$\rho^{(u,v,i)}=(\nu^{(u,v,i)},\mu_h^{(u,v,i)},\lambda_g^{(u,v,i)},\lambda_h^{(u,v,i)},s^{(u,v,i)})$$

$$\nu^{(u,v,i)}=(h_{u,i})^{\xi_2^{(u,v,i)}}$$

$$\mu_h^{(u,v,i)}=((h_{u,i})^{\xi_2^{(u,v,i)}}\times\phi_h^{(u,v,i)})^{\xi_1^{(u,v,i)}}$$

$$\lambda_g^{(u,v,i)}=(\phi_g^{(u,v,i)})^{\xi_3^{(u,v,i)}}$$

$$\lambda_h^{(u,v,i)}=((h_{u,i})^{\xi_2^{(u,v,i)}}\times\phi_h^{(u,v,i)})^{\xi_3^{(u,v,i)}}$$

$$e^{(u,v,i)}=H(com_u\|\nu^{(u,v,i)}\|\mu_g^{(u,v,i)}\|\mu_h^{(u,v,i)}\|\lambda_g^{(u,v,i)}\|\lambda_h^{(u,v,i)})$$

$$s^{(u,v,i)}=\xi_1^{(u,v,i)}-e^{(u,v,i)}\times\xi_3^{(u,v,i)}$$ (Formula 26)

Thus, an answering message is expressed by the following formula 27.

$$ans_{u,v}=\{\mu_g^{(u,v,i)},\rho^{(u,v,i)}\}_{i=1}^n$$ (Formula 27)

[5] The network terminal 1200$u$, which has received the answering message $ans_{u,v}$, performs the following processings, where $i=1, \ldots, n$.

(a) verify the certification $\rho^{(u,v,i)}$ using the commitment $com_v$ of the network terminal 1200$u$. Specifically, the following formulas 28 are computed and it is verified whether the formula 29 holds true.

$$\tilde{e}^{(u,v,i)} = H(com_u\|\nu^{(u,v,i)}\|\mu_g^{(u,v,i)}\|\mu_h^{(u,v,i)}\|\lambda_g^{(u,v,i)}\|\lambda_h^{(u,v,i)})$$ (Formula 28)

$$\sigma_g^{(u,v,i)} = D_{y_u}\left((\mu_g^{(u,v,i)})^{1/t_g^{(u,i)}}\right)\left[=g^{\xi_1^{(u,v,i)}\times f_v(\alpha_{u,i})}\right]$$

$$\sigma_h^{(u,v,i)} = D_{y_u}\left((\mu_h^{(u,v,i)})^{1/t_h^{(u,i)}}\right)\left[=h^{\xi_1^{(u,v,i)}\times(w_v(\alpha_{u,i})+\xi_2^{(u,v,i)})}\right]$$

$$\tau_g^{(u,v,i)} = D_{y_u}\left((\lambda_g^{(u,v,i)})^{1/t_g^{(u,i)}}\right)\left[=g^{\xi_3^{(u,v,i)}\times f_v(\alpha_{u,i})}\right]$$

$$\tau_h^{(u,v,i)} = D_{y_u}\left((\lambda_h^{(u,v,i)})^{1/t_h^{(u,i)}}\right)\left[=h^{\xi_3^{(u,v,i)}\times(w_v(\alpha_{u,i})+\xi_2^{(u,v,i)})}\right]$$

$$\eta^{(u,v,i)} = (\nu^{(u,v,i)})^{1/t_h^{(u,i)}} \times \prod_{j=1}^n C_{v,j}^{c_{u,j}^j}\left[=g^{f_v(\alpha_{u,i})}h^{(w_v(\alpha_{u,i})+\xi_2^{(u,v,i)})}\right]$$

$$\tau_g^{(u,v,i)}\tau_h^{(u,v,i)} = (\eta^{(u,v,i)})^{s^{(u,v,i)}}(\sigma_g^{(u,v,i)}\sigma_h^{(u,v,i)})^{\tilde{e}^{(u,v,i)}}$$ (Formula 29)

(b) Perform the exception processing if the verification is not passed. If $\sigma_g^{(u,v,i)}=1$, the equation of $f_v(\alpha_{u,i})=0$ holds true, and therefore, it is proved that the relation of $\alpha_{u,i}\in L_v$ is established. To the contrary, if $\sigma_g^{(u,v,i)}\neq 1$ the relation expressed by the following formula 30 is resulted.

$$\alpha_{u,i}\notin L_v$$ (Formula 30)

[6] When an exception occurs, the network terminal 1200$u$ uses a value expressed by the following formula 31 included in the commitment $com_v$ of the network terminal 1200$v$ to perform the exception processing. Specifically, the following formulas 32 are computed.

$$\psi_t^{(v,i)}=E_{y_T}(g^{\alpha_{v,i}})$$ (Formula 31)

$$\kappa_1^{(u,v,i,j)}=(\psi_t^{(v,i)})\times g^{-\alpha_u j}y_u^{z^{(u,v,i,j)}}[=E_{y_T}(g^{\alpha_{v,j}-\alpha_u j}y_u^{z^{(u,v,i,j)}})]$$

$$\kappa_2^{(u,v,i,j)}=g^{z^{(u,v,i,j)}}$$ (Formula 32)

$$ereq_{v,u}=\{\kappa_1^{(u,v,i,j)},\kappa_2^{(u,v,i,j)}\}_{i,j=1}^n$$ (Formula 33)

Then, a value expressed by the following formula 33 is transmitted to the TTP server 1210. The TTP server 1210 decrypts $\kappa_1$ to obtain the following formula 34.

$$\{D_{y_T}(\kappa_1^{(u,v,i,j)}),(\kappa_2^{(u,v,i,j)})\}_{i,j=1}^n=E_{y_T}(g^{\alpha_{v,j}-\alpha_u j})$$ (Formula 34)

This formula represents the ElGamal encryption using the public key $y_u$ of the network terminal 1200$u$, which is semantically secure so that any information indicating the common part to the lists $L_u$, $L_v$ is not leaked to the TTP server 1210. The TTP server 1210 raises the result of the formula 34 to $z^{(u,v,i,j)}$-th power for randomizing, and transmits the result, specifically, expressed by the following formula 35, to the network terminal 1200$u$. The network terminal 1200$u$ decrypts this, and if the decryption results in 1, it can be determined as the common part.

$$eans_{v,u}=\{(E_{y_T}(g^{\alpha_{v,j}-\alpha_u j}))^{z^{(u,v,i,j)}}\}_{i,j=1}^n$$ (Formula 35)

Next, details of the algorithms used in this embodiment will be described.

In the following description, reference symbol $Y_T$ denotes a public key of the TTP server 1210.

Commitment Generation Algorithm C

Input: the list $L_{u0}$ held by the network terminal 1200$u$

Output: the commitment $com_u$ and the commitment open value $open_{u0}$

Processing:

(1) For the list $L_u$, a polynomial as expressed by the following formula 36 is created.

$$eans_{v,u}=\{(E_{y_T}(g^{\alpha_{v,j}-\alpha_u j}))^{z^{(u,v,i,j)}}\}_{i,j=1}^n$$ (Formula 36)

Here, coefficients are represented by the following formula 37.

$$\{a_{u,1}\}_{l=1}^{n} \quad \text{(Formula 37)}$$

(2) Values $b_{u,l}$, where $l=1, \ldots, n$, are selected, and the following formula 38 is computed.

$$c_{u,i}=g^{\alpha_{u,i}}h^{b_{u,i}} \quad \text{(Formula 38)}$$

Here, the following formula 39 is defined.

$$w_u(x)=\Sigma_{l=1}^{n}b_{u,1}x^l (\bmod q) \quad \text{(Formula 39)}$$

(3) The following formula 40 is computed.

$$\{d_{u,i}\}_{i=1}^{n}$$

$$d_{u,i}=(g_{u,i},h_{u,i},\{\psi_g^{(u,i,j)}\}_{j=1}^{n},\{\psi_h^{(u,i,j)}\}_{j=1}^{n},\{\psi_c^{(u,i,j)}\}_{j=1}^{n},\psi_t^{(u,i)},pk_{u,i,1},pk_{u,i,2}) \quad \text{(Formula 40)}$$

Values in this formula is computed as expressed by the following formulas 41.

$$t_g^{(u,i)},t_h^{(u,i)} \in Z_q$$

$$g_{u,i}=g^{t_g^{(u,i)}},h_{u,i}=h^{t_h^{(u,i)}}$$

$$\{\psi_g^{(u,i,j)}=E_{y_u}(g_{u,i}^{\alpha_{u,i}^j})\}_{j=1}^{n}$$

$$\{\psi_h^{(u,i,j)}=E_{y_u}(h_{u,i}^{\alpha_{u,i}^j})\}_{j=1}^{n}$$

$$\{\psi_c^{(u,i,j)}=E_{y_u}(c_{u,i}^{\alpha_{u,i}^j})\}_{j=1}^{n}$$

$$\{\psi_t^{(u,i)}=E_{y_T}(g^{\alpha_{u,i}})\}$$

$$pk_{u,i,1}=PK\{(\{\gamma_j\}_{j=1}^{n}):(D_{y_u}(\psi_g^{(u,i,j)})=g_{u,i}^{\gamma_j})_{j=1}^{n} \land (D_{y_u}(\psi_h^{(u,i,j)})=h_{u,i}^{\gamma_j})_{j=1}^{n}$$

$$\land (D_{y_u}(\psi_c^{(u,i,j)})=c_{u,i}^{\gamma_j})_{j=1}^{n} \land (D_{y_T}(\psi_t^{(u,i)})=g^{\gamma_j})\}$$

$$pk_{u,i,2}=PK\{(\delta):(D_{y_u}(\psi_g^{(u,i,j)})=g_u^{\delta^j})_{j=1}^{n}\} \quad \text{(Formula 41)}$$

(4) The commitment open value $\text{open}_u$ expressed by the following formula 42 is output.

$$\text{open}_u=(\{a_{u,l},b_{u,l}\}_{l=1}^{n},\{t_g^{(u,i)},t_h^{(u,i)}\}_{j=1}^{n}) \quad \text{(Formula 42)}$$

(5) The commitment $\text{com}_u$ expressed by the following formula 43 is output.

$$\text{com}_u=(\{c_{u,1}\}_{l=1n}\|\{d_{u,i}\}_{i=1}^{n} \quad \text{(Formula 43)}$$

Commitment Verifying Algorithm V
Input: the commitment $\text{com}_{v0}$ of the network terminal 1200v
Output: the verification result $\{0, 1\}$
Processing:

$$\{d_{u,i}\}_{i=1}^{n} \quad \text{(Formula 44)}$$

$$\{pk_{u,i,1}\}_{i=1}^{n} \text{ and } \{pk_{u,i,2}\}_{i=1}^{n} \quad \text{(Formula 45)}$$

The certifications expressed by the formulas 45 included in the public information expressed by the formula 44 is verified, and if all the commitments $\text{com}_v$ are accepted, the value of 1 is output, or otherwise, the value of 0 is output.

Matching Algorithm M
Input: the commitment open value $\text{open}_u$ of the network terminal 1200u and the legal commitment $\text{com}_{v0}$ of the network terminal 1200v
Output: the answering message $\text{ans}_{u,v0}$
Processing:

$$\{a_{u,1},b_{u,1}\}_{j=1}^{n} \quad \text{(Formula 46)}$$

(1) A value expressed by the following formula 46 included in the commitment open value $\text{open}_u$ is used to perform computations (a)-(d) expressed by the following formulas 47, where $i=1, \ldots n$.

$$\text{(a)} \phi_g^{(u,v,i)}, \phi_h^{(u,v,i)} \quad \text{(Formula 47)}$$

are computed as follows.

$$\varphi_g^{(u,v,i)}=E_{y_u}(g_{u,i}) \times \prod_{j=1}^{n}(\psi_g^{(u,v,j)})^{a_{v,j}}=E_{y_u}(g_{u,i}^{f_u(\alpha_{u,i})})$$

$$\varphi_h^{(u,v,i)}=\prod_{j=1}^{n}(\psi_h^{(u,v,j)})^{b_{v,j}}=E_{y_u}(h_{u,i}^{w_u(\alpha_{u,i})})$$

$$\text{(b)} \xi_1^{(u,v,i)},\xi_2^{(u,v,i)},\xi_3^{(u,v,i)} \in_R Z_q$$

$$\text{(c)} \mu_g^{(u,v,i)}=\phi_g^{(u,v,i)\xi_1^{(u,v,i)}}$$

$$\text{(d)} \rho^{(u,v,i)}=(\nu^{(u,v,i)},\mu_h^{(u,v,i)},\lambda_g^{(u,v,i)},\lambda h^{(u,v,i)},s^{(u,v,i)})$$

are computed using the following formulas.

$$\nu^{(u,v,i)}=(h_{u,i})^{\xi_2^{(u,v,i)}}$$

$$\mu_h^{(u,v,i)}=((h_{u,i})^{\xi_2^{(u,v,i)}} \times \phi_h^{(u,v,i)})^{\xi_1^{(u,v,i)}}$$

$$\lambda_g^{(u,v,i)}=(\phi_g^{(u,v,i)})^{\xi_3^{(u,v,i)}}$$

$$\lambda_h^{(u,v,i)}=((h_{u,i})^{\xi_2^{(u,v,i)}} \times \phi_h^{(u,v,i)})^{\xi_3^{(u,v,i)}}$$

$$e^{(u,v,i)}=H(\text{com}_u\|\nu^{(u,v,i)}\|\mu_g^{(u,v,i)}\|\mu_h^{(u,v,i)}\|\lambda_g^{(u,v,i)}\|\lambda_h^{(u,v,i)})$$

$$s^{(u,v,i)}=\xi_1^{(u,v,i)}-e^{(u,v,i)} \times \xi_3^{(u,v,i)}$$

(2) The answering message $\text{ans}_{u,v}$ expressed by the formula 48 is output.

$$\text{ans}_{u,v}=\{\mu_g^{(u,v,i)},\rho^{(u,v,i)}\}_{i=1}^{n} \quad \text{(Formula 48)}$$

Result Output Algorithm D
Input: the answering message $\text{ans}_{v,u}$ from the network terminal 1200v to the network terminal 1200u, the legal commitment $\text{com}_v$ of the network terminal 1200v, and the list $L_u$, secret key $K_u$ and commitment open value $\text{open}_{u0}$ of the network terminal 1200u
Output: the common part $L_{v,u}$ $(=L_v \cap L_u)$ among the lists $L_u$ and $L_v$, or error message
Processing: values shown by the formulas 49 are used as inputs.
The following processings are performed, where $i=1, \ldots, n$.

$$\{c_{u,1}\}_{l=1}^{n} \text{ included in } \text{com}_u$$

$$\{t_g^{(u,i)},t_h^{(u,i)}\}_{j=1}^{n} \text{ included in } \text{open}_u$$

$$L_u=\{\alpha_{u,1}\}_{l=1}^{n} \quad \text{Formula 49}$$

(1) Certification

In order to verify the certification expressed by the formula 50, the following formulas 51 are computed.

$$\rho^{(u,v,i)} = (v^{(u,v,i)}, \mu_h^{(u,v,i)}, \lambda_g^{(u,v,i)}, \lambda_h^{(u,v,i)}, s^{(u,v,i)})$$ (Formula 50)

$$\tilde{e}^{(u,v,i)} = H(com_u \| v^{(u,v,i)} \| \mu_g^{(u,v,i)} \| \mu_h^{(u,v,i)} \| \lambda_g^{(u,v,i)} \| \lambda_h^{(u,v,i)})$$ (Formula 51)

$$\sigma_g^{(u,v,i)} = D_{y_u}\left((\mu_g^{(u,v,i)})^{1/t_g^{(u,i)}}\right)$$

$$\sigma_h^{(u,v,i)} = D_{y_u}\left((\mu_h^{(u,v,i)})^{1/t_h^{(u,i)}}\right)$$

$$\tau_g^{(u,v,i)} = D_{y_u}\left((\lambda_g^{(u,v,i)})^{1/t_g^{(u,i)}}\right)$$

$$\tau_h^{(u,v,i)} = D_{y_u}\left((\lambda_h^{(u,v,i)})^{1/t_h^{(u,i)}}\right)$$

$$\eta^{(u,v,i)} = (v^{(u,v,i)})^{1/t_h^{(u,i)}} \times \prod_{j=1}^{n} C_{v,j}^{\alpha_{u,j}}$$

(2) If the following formula 52 does not hold true, an error message is output and the processing is ended.

$$\tau_g^{(u,v,i)} \tau_h^{(u,v,i)} = (\eta^{(u,v,i)})^{s^{(u,v,i)}} (\sigma_g^{(u,v,i)} \sigma_h^{(u,v,i)})^{\tilde{e}^{(u,v,i)}}$$ (Formula 52)

(3) If $\sigma_g^{(u,v,i)}$ is satisfied, $\alpha_{u,i}$ is output and the processing is ended.

Exception Processing Request Generation Algorithm P

Input: the legal commitment $com_v$ of the network terminal $1200v$ and the list $L_{u0}$ of the network terminal $1200u$ Output: the exception processing request message $ereq_{v,u0}$ Processing:

(1) Using $\sigma_t^{(u,i)}$ included in the commitment $com_v$ and the list $L_u$, the following formulas 53 are computed, where i = 1, ..., n.

$$z^{(u,v,i,j)} \in_R Z_q$$

$$\kappa_1^{(u,v,i,j)} = (\psi_t^{(v,i)} \times g^{-\alpha_{u,j}} y_u^{z^{(u,v,i,j)}})$$

$$\kappa_2^{(u,v,i,j)} = g^{z^{(u,v,i,j)}}$$ (Formula 53)

(2) The exception processing request message $ereq_{v,u}$ expressed by the formula 54 is output.

$$ereq_{v,u} = \{\kappa_1^{(u,v,i,j)}, \kappa_2^{(u,v,i,j)}\}_{i,j=1,\ldots n}$$ (Formula 54)

Exception Processing Algorithm T

Input: the exception processing request message $ereq_{v/u}$ and the secret key $K_{T0}$ of the TTP server 1210

Output: the exception processing answering message $eans_{v,u}$ or error message Processing: it is confirmed that a fault (exception) occurs in the information exchange between the network terminals 1200u and 1200v according to a predetermined procedure described later. If the confirmation fails, the error message is output and returned to the network terminal 1200u, and the processing is ended. If the confirmation succeeds, using a decryption function $D_{yT}$ using the secret key $K_T$, the following processings are performed.

(1) The following formulas 55 are computed, where i, j = 1, ..., n.

$$\tilde{z}^{(u,v,i,j)} \in_R Z_q$$

$$\tilde{\kappa}^{(u,v,i,j)} = (D_{yT}(\kappa_1^{(u,v,i,j)}))^{\tilde{z}^{(u,v,i,j)}}$$

$$\tilde{\kappa}_2^{(u,v,i,j)} = (\kappa_2^{(u,v,i,j)})^{\tilde{z}^{(u,v,i,j)}}$$ (Formula 55)

(2) The exception processing answering message $eans_{v,u}$ expressed by the formula 56 is output.

$$ereq_{v,u} = \{\tilde{\kappa}_1^{(u,v,i,j)}, \tilde{\kappa}_2^{(u,v,i,j)}\}_{i,j=1,\ldots n}$$ (Formula 56)

Exception Processing Result Generation Algorithm W

Input: the exception processing answering message $eans_{v,u}$ and the secrete key $K_{u0}$ of the network terminal 1200u Output: the common part $L_{v,u}$ ($=L_v \cap L_u$) among the lists $L_u$ and $L_v$ Processing: the following processings are performed, where i, j=1, ..., n.

(1) A value of $\sigma^{(u,v,i,j)}$ is computed using the following formula 57.

$$\sigma_t^{(u,v,i,j)} = D_{y_u}(\tilde{\kappa}_2^{(u,v,i,j)}, \tilde{\kappa}_1^{(u,v,i,j)})$$ (Formula 57)

(2) If $\sigma_t^{(u,v,i,j)} = 1$, $\alpha_{u,i}$ is output.

Now, a verification method for the TTP server 1210 to confirm that a fault (exception) actually occurs in the information exchange between the network terminals 1200u and 1200v will be described.

To execute the exception processing algorithm, the TTP server 1210 has to confirm that a fault (exception) occurs in the information exchange between the network terminals 1200u and 1200v. If the matching result output unit 1204 outputs the error message, the TTP server 1210 can confirm the occurrence of the exception by verifying also the certification therefor. Further, in the computation of the common part to the lists of the network terminals 1200u and 1200v, for example, an exception may occur due to the fact that the network terminal 1200v transmits no answering message to the network terminal 1200u, although the network terminal 1200u transmits the answering message to the network terminal 1200v. In such a case, even if the error message is not output, the exception has to be addressed. However, it is quite difficult for the TTP server 1210 to distinguish the following two cases from each other.

A case where the network terminal 1200v truly does not transmit the answering message to the network terminal 1200u.

A case where although any information exchange does not actually occur between the network terminals 1200u and 1200v, the network terminal 1200u claims that the exception occurs, and illegally tries to know the common part with the list held by the network terminal 1200v.

Generally, these cases can be distinguished from each other by using a transaction certificate with a time limit by combining encryption means and non-encryption means with each other. The "time limit" used herein means to add a policy restriction to the transaction certificate in that:

(1) before the "time limit", the TTP server accepts no exception request under circumferences where any of the network terminals provides a transaction stop certificate; and (2) after the "time limit", the TTP server 1210 accepts the exception request and solves the problem when any of the network terminals provides the transaction certificate.

Figure 16:
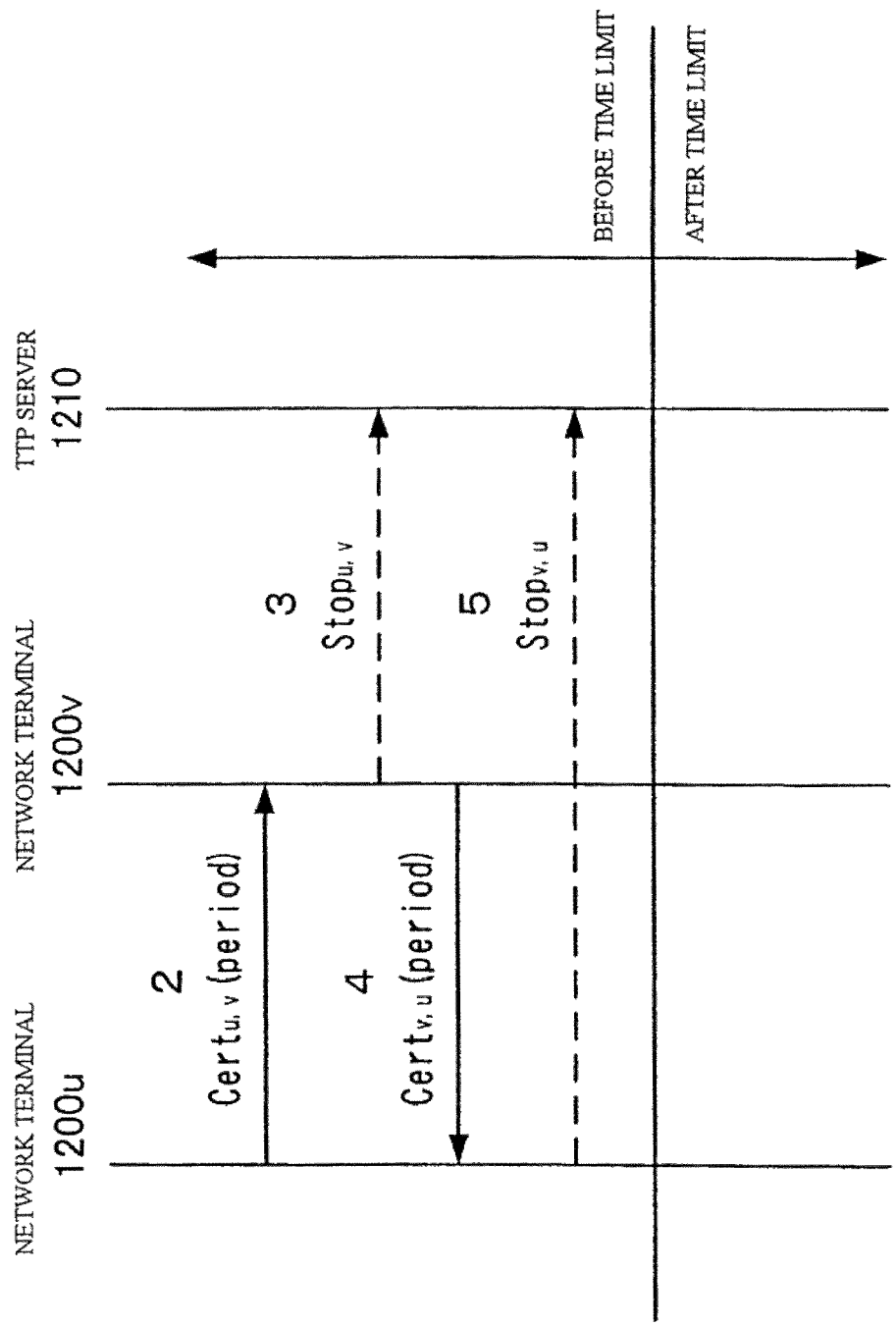
FIG. 16 is a diagram for illustrating a method for verifying an occurrence of an exception using a transaction certificate with a time limit.

FIG. 16 is a diagram for illustrating the method for verifying an occurrence of an exception using the transaction certificate with a time limit.

Referring to FIG. 16, the verification method is implemented in the following procedure. Here, numbers in the drawing correspond to the numbers in the procedure.

1. The network terminal 1200u confirms the correctness of the commitment $com_v$ of the network terminal 1200v.

2. The network terminal 1200u transmits a transaction certificate with a time limit $Cert_{u,v}$ (period) to the network terminal 1200v.

3. The network terminal 1200v transmits a transaction stop certificate $Stop_{v,u}$ to the TTP server 1210 in any of cases where:

the transaction certificate with a time limit $Cert_{u,v}$ (period) is an illegal one;

the transaction certificate with a time limit $\text{Cert}_{u,v}$ (period) cannot be transmitted within the time limit; and the correctness of the commitment $\text{com}_v$ of the network terminal 1200v cannot be confirmed.

4. The network terminal 1200v transmits a transaction certificate with a time limit $\text{Cert}_{v,u}$ (period) to the network terminal 1200v.

5. The network terminal 1200u transmits a transaction stop certificate $\text{Stop}_{u,v}$ to the TTP server 1210 if the transaction certificate with a time limit $\text{Cert}_{v,u}$ (period) is an illegal one or cannot be received within the time limit.

6. The network terminal 1200u transmits an answer $\text{ans}_{u,v}$ to the network terminal 1200v after the time limit.

7. The network terminal 1200v transmits an answer $\text{ans}_{v,u}$ to the network terminal 1200u after the time limit.

8. If the network terminal 1200u cannot receive the answer $\text{ans}_{v,u}$, the network terminal 1200u transmits the transaction certificate with a time limit $\text{Cert}_{v,u}$ (period) to the TTP server 1210 to request the server to address the exception.

9. If the network terminal 1200v cannot receive the answer $\text{ans}_{u,v}$, the network terminal 1200v transmits the transaction certificate with a time limit $\text{Cert}_{u,v}$ (period) to the TTP server 1210 to request the same to address the exception.

In this way, in response to the exception processing request from the network terminals 1200u, 1200v, the TTP server 1210 can perform the exception processing through the exception processing execution unit 1211 after confirming that a fault (exception) occurs in the information exchange between the network terminals 1200u and 1200v.

This embodiment is based on the least assumption of confidence to the TTP server 1210. If the TTP server is not allowed to access the commitments of the network terminals, it cannot get any information associated with the lists even when performing the exception processing. However, if the TTP server is operated by a single network terminal 1200, there remains a potential risk of illegal access to a secret held in each network terminal 1200 through illegal determination of the exception occurrence or illegal acquirement of the commitment. To address such a risk, as in the case of the secret distribution in the second embodiment, the TTP server 1210 may be split into a plurality of servers to have a threshold access structure, in which the exception processing can be performed only when the TTP servers 1210 having a value equal to or higher than a threshold cooperate with each other, thereby dramatically enhancing the confidence to the TTP server 1210.

According to this embodiment, the TTP server 1210 essentially serves to:

(1) confirm the occurrence of the exception; and (2) operate the secret key for the ElGamal encryption.

It is known that these functions can be readily distributed in the threshold access structure using a well-known prior art. Thus, secure operation of the TTP server 1210 according to this embodiment can be readily realized.

In this way, the system according to this embodiment satisfies the following requirements in performing matching of items of lists held by a plurality of network terminals 1200. In the following description, reference symbol C denotes the commitment generation algorithm, reference symbol V denotes the commitment verification algorithm, reference symbol M denotes the matching algorithm, reference symbol D denotes the result output algorithm, reference symbol P denotes the exception processing request generation algorithm, reference symbol T denotes the exception processing algorithm and reference symbol W denotes the exception processing result generation algorithm.

1. Confidentiality of Commitment

The value of the commitment, which is open information, provides no information on the list. That is, with respect to the lists $L_u$ and Lv and the commitments $\text{com}_u$ and $\text{com}_v$, if conditions of $L_u \neq L_v$, $\text{com}_u \leftarrow C(L_u)$ and $\text{com}_v \leftarrow C(L_v)$ are satisfied, it is impossible to determine which of the lists $L_u$ and Lv corresponds to any given one of the commitments $\text{com}_u$ and $\text{com}_v$ with a probability higher than 50%.

2. Verifiability of Commitment

It can be verified that the common part can be obtained by generating the commitment $\text{com}_u$ by the commitment generation algorithm C and performing the exception processing using the commitment $\text{com}_u$ as the input.

3. Confidentiality of Answering Message

When conditions of $V(\text{com}_u)=1$, $\text{open}_v \leftarrow C(L_v)$ and $\text{ans}_{v,u}=M(\text{open}_v, \text{com}_u)$ are satisfied, the network terminal 1200u cannot get any information on the list Lv from the answering message $\text{ans}_{v,u}$, except for the information that $L_{v,u}$ is the common part.

4. Verifiability of Answering Message

It can be verified that the common part obtained from the answering message is the common part with the list corresponding to the commitment of the partner. That is, when conditions of $V(\text{com}_v)=1$ and $\text{open}_u \leftarrow C(L_u)$ are satisfied, the result $\text{res}_{u,v}=D(\text{ans}_{v,u}, \text{com}_v, L_u, K_u, \text{open}_u)$ for the answering message $\text{ans}_{v,u}$ is the common part $L_{v,u}$ among the lists $L_u$ and $L_v$, if it is not an error message.

5. Exception Processing by Arbitration Organization

With respect to the commitment $\text{com}_v$ satisfying a condition of $V(\text{com}_v)=1$, assuming that the exception processing request message $\text{ereq}_{v,u}=P(\text{com}_v, L_u)$, the exception request answering message $\text{eans}_{v,u}=T(\text{ereq}_{v,u}, K_T)$ and the exception processing result $\text{eres}_{v,u}=W(\text{eans}_{v,u}, K_u)$, the exception processing result $\text{eres}_{v,u}$ is the common part $L_{v,u}$ among the lists $L_u$ and $L_v$. Only the exception processing algorithm T uses the secret key $K_T$ of the TTP server 1210 as the input (that is, the TTP server 1210 is involved only in the exception processing and is not used in the normal process).

6. Efficiency

Communication is established from the network terminal 1200u to the network terminal 1200v once in the commitment phase, and once in the normal process. In addition, the TTP server 1210 is involved only in the exception processing and is not used in the normal process.

Now, applications of the network system for providing various services will be described.

(1) Match Making Service

In the past, generally, when one uses the Internet to search for another having the same interest as himself/herself, he/she has opened information about his/her interest on a webpage and waited for a response from an unspecific one, or passed the information to an agent server for intermediation.

However, according to the former method, private information has to be opened. According to the latter method, privacy protection has to be entrusted to the agent server, and there has been a risk of leaking information about participants if the security of the agent server is broken.

Using the network system according to the first embodiment as it is can provide a match making service with high security. That is, if the match making server 400 shown in FIG. 4 is used as the agent server, the agent server can compute only the common items among information (lists) of participants without getting information of the individual participants. In addition, the agent server can also serve to inform the participants of only the number of common items, rather than to make a list of the common items.

Besides, using the network system according to the second embodiment as it is can provide a highly secure system without the agent server, in which only the participants can know the common items among the lists thereof.

Further, using the network system according to the third embodiment can provide a highly secure, efficient and highly practical system, in which, in the normal process, the participants can know the common items among the information (lists) of the participants only through information exchange therebetween.

Figure 17:
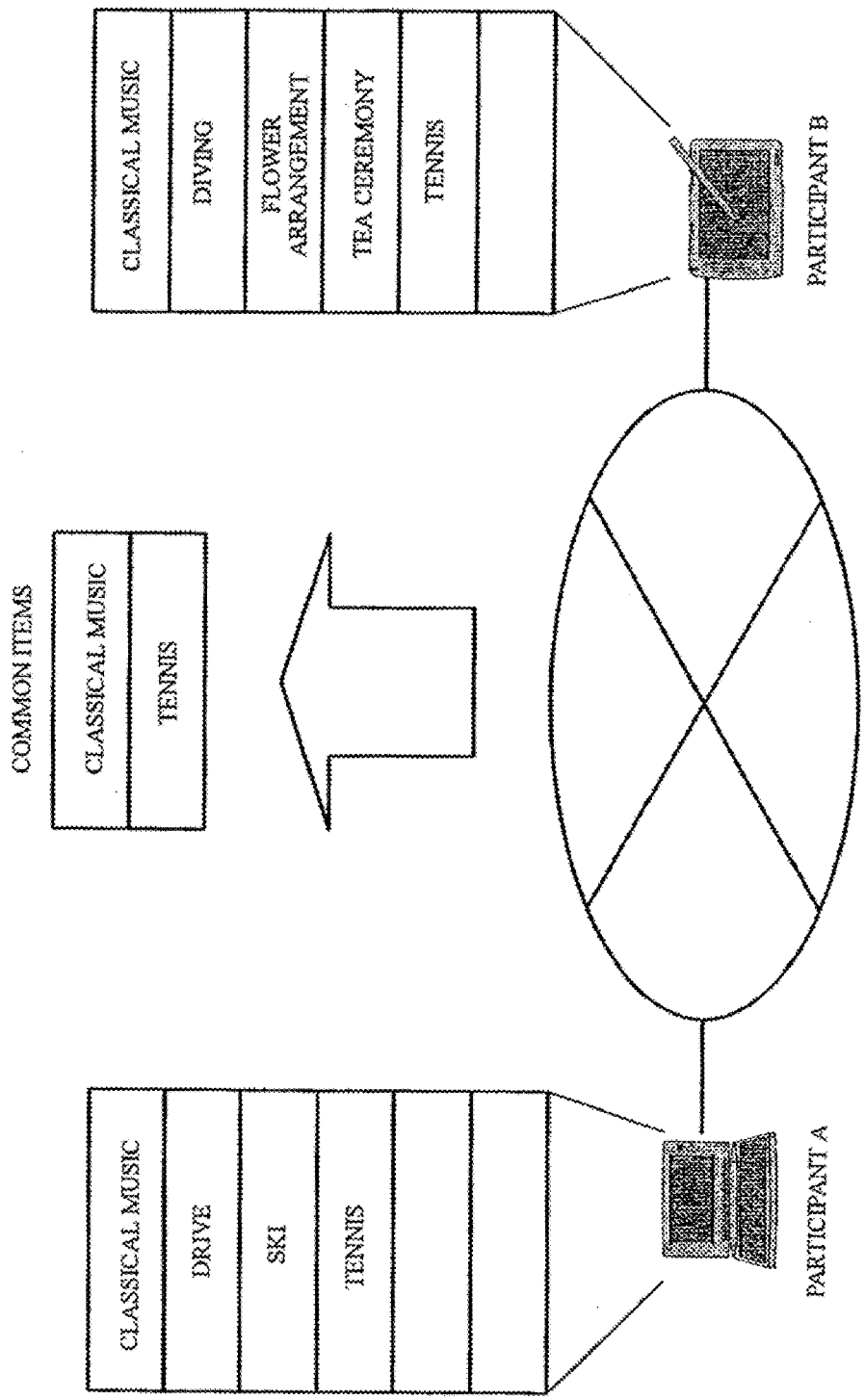
FIG. 17 schematically shows the match making service according to this invention.

FIG. 17 schematically shows the match making service using the network system. Referring to this drawing, a list of a participant A containing "classical music", "drive", "ski" and "tennis" and a list of a participant B containing "classical music", "diving", "flower arrangement", "tea ceremony" and "tennis" are subject to match making, and the common items of "classical music" and "tennis" are extracted. Therefore, it is proved that both the participants A and B have interests in these common items.

Furthermore, such a network system may be implemented by an application of a cellular phone with a radio broadcasting function such as Bluetooth. In such a case, the following service can be provided. That is, if users have previously registered information including their interests with their respective cellular phones, when users having the same interest (having registered the same items) come within a certain distance of each other, their respective cellular phones start to communicate with each other.

As a modification of the match making service, the list matching may be performed by specifying information of a partner to be searched for. In this case, each of the participants prepares two lists, that is, a list of the information about himself/herself (self-list, hereinafter) and a list of the information of the partner to be searched for (partner-list, hereinafter), and performs list matching on the partner-list held by himself/herself and the self-lists held by the others. Similarly, each participant performs list matching on the partner-lists held by the others and the self-list held by himself/herself.

As such an intermediation service, for example, such a service is also possible that the participants A and B each prepares two lists of the profile of himself/herself and the profile of the partner to be searched for, and a correspondence of the profile between one participant and the other is computed by performing two list common part computations on the self-profile of the participant A and the partner-profile of the participant B and on the partner-profile of the participant A and the self-profile of the participant B, thereby providing the correspondence as information about the affinity between the participants A and B.

Alternatively, the participant A may prepare one list describing the profile items of himself/herself as they are and the profile items of the partner as negative roots provided by multiplying them by −1. And, the participant B may prepare one list describing the profile items of himself/herself as negative roots provided by multiplying them by −1 and the profile items of the partner as they are. Thus, each participant can represent the self-list and the partner-list by one list. By using this list, the information about the affinity between the participants A and B can be obtained through one list common part computation.

(2) List Inquiry

Financial institutes, such as banks and credit companies, make a profit by providing financing for customers. Therefore, credit information about the customers is quite essential for administration. In particular, the list of persons in arrears is essential to estimate the risk of providing financing. On the other hand, many of the customers obtain financing from a plurality of financial institutes. Thus, for credit examination or the like, it may be desired to compare the lists of customers in arrears (referred to as black lists) among the plurality of financial institutes. In other words, by sharing the information on the arrears among the financial institutes, the credit information about the customers can be created more accurately.

However, the list of persons in arrears is an essential company secret for the financial institutes. Thus, to ensure the privacy of the customers and the confidence to the financial institutes, it is necessary to search for only the customers registered with the lists of a plurality of financial institutes, without disclosing the list of persons in arrears.

In this case, if the list inquiry is performed by using the network system according to the first, second or third embodiment, only the information about the common part among the lists (customers listed in the lists of the financial institutes to be investigated) can be extracted and exchanged evenly among the financial institutes.

(3) Data Integration of Human Resource Data Bank

Human resource data banks have information (list) about skills, desired jobs or the like of registrants as a company secret, and companies ready for adoption have a list of skills, job descriptions or the like required for prospective employees. Effective provision or acquirement of human resources can be realized by extracting the common part among the lists. However, the information about the human resources the companies wish to acquire includes information about their respective essential strategies. Thus, it is undesirable that information in the list except for the common part is known to the other companies.

In this case, if the list inquiry is performed by using the network system according to the first, second or third embodiment, the common part (information) to the demander and supplier of the human resource can be extracted while keeping the human resource data itself in secret.

(4) Matching Database of Commodity Price in Electronic Commerce Market

In the electronic commerce market, a commodity price is established by maintaining the demand and supply balance between a seller and a buyer. In this case, both the seller and the buyer have their respective lists of commodity numbers and desired prices, and a price satisfying the wishes of the seller and buyer can be established by extracting the common part to the lists. The intended prices of commodities are important secret information both for the seller and the buyer. Therefore, it is advantageous that, from the lists of the desired prices, only the information about the commodities for which the desired prices of the seller and buyer agree with each other.

In this case, if the list inquiry is performed by using the network system according to the first, second or third embodiment, the seller and the buyer can investigate which commodity prices agree with each other, while keeping their respective desired commodities and prices thereof in secret.

As described above, according to this invention, the security in the information exchange can be ensured, and list matching with higher efficiency and practicality can be provided. In addition, according to this invention, by using the distributed secret computation, a secure method for peer-to-peer list matching can be provided.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A network system comprising a plurality of information terminals that exchange information via a network, the system comprising:
    a first information terminal configured to generate a polynomial having a root equivalent to an item of a list held by the terminal itself, generates and opens first information based on the polynomial and generates second information based on the polynomial; and
    a second information terminal that obtains and verifies said first information of said first information terminal, and if the verification is passed, obtains said second information from the first information terminal, and based on the first and second information and said polynomial generated from a list held by the terminal itself, determines a common item among the list used to generate the open information and the list held by the terminal itself.

2. The network system of claim 1, wherein said second information terminal generates a polynomial having roots equivalent to the items of the list held by the terminal itself and generates and opens first information based on the polynomial, and
    said first information terminal generates said second information using said first information of said second information terminal, which is opened.

3. The network system of claim 1, further comprising:
    a server that obtains encrypted data generated based on said first information of said first information terminal and the list held by said second information terminal, and determines, while keeping secret contents of the lists held by said first and second information terminals, a common item to the lists,
    wherein, if it is impossible to obtain said second information or to determine the common item to said lists based on said obtained second information, said second information terminal generates said encrypted data to transmit the same to said server and decrypts a response data from the server to obtain the common item to said lists.

* * * * *